(12) United States Patent
Varadarajan et al.

(10) Patent No.: US 11,507,420 B2
(45) Date of Patent: *Nov. 22, 2022

(54) SYSTEMS AND METHODS FOR SCHEDULING TASKS USING SLIDING TIME WINDOWS

(71) Applicant: Honeywell International Inc., Charlotte, NC (US)

(72) Inventors: Srivatsan Varadarajan, St. Louis Park, MN (US); Larry James Miller, Black Canyon City, AZ (US); Arthur Kirk McCready, Glendale, AZ (US); Aaron R. Larson, Shoreview, MN (US); Richard Frost, Avondale, AZ (US); Ryan Lawrence Roffelsen, Tigard, OR (US)

(73) Assignee: Honeywell International Inc., Charlotte, NC (US)

( * ) Notice: Subject to any disclaimer, the term of this patent is extended or adjusted under 35 U.S.C. 154(b) by 115 days.

This patent is subject to a terminal disclaimer.

(21) Appl. No.: 17/014,801

(22) Filed: Sep. 8, 2020

(65) Prior Publication Data
US 2020/0401450 A1 Dec. 24, 2020

Related U.S. Application Data

(63) Continuation of application No. 14/737,010, filed on Jun. 11, 2015, now Pat. No. 10,768,984.

(51) Int. Cl.
*G06F 9/50* (2006.01)
*G06F 9/48* (2006.01)
(52) U.S. Cl.
CPC .......... *G06F 9/5005* (2013.01); *G06F 9/4812* (2013.01); *G06F 9/4881* (2013.01)

(58) Field of Classification Search
CPC ..... G06F 9/5005; G06F 9/4812; G06F 9/4881
See application file for complete search history.

(56) References Cited

U.S. PATENT DOCUMENTS

| 6,230,200 B1 | 5/2001 | Forecast et al. |
| 7,093,250 B1 | 8/2006 | Rector |

(Continued)

FOREIGN PATENT DOCUMENTS

| CN | 103544065 A | 1/2014 |
| CN | 103544065 B | 2/2017 |

(Continued)

OTHER PUBLICATIONS

Malos et al; "Conservative Dynamic Energy Management for Real-Time Dataflow Applications Mapped on Multiple Processors"; 10 pages (Year: 2009).*

(Continued)

*Primary Examiner* — Wei Y Zhen
*Assistant Examiner* — Brahim Bourzik
(74) *Attorney, Agent, or Firm* — Fogg & Powers LLC

(57) ABSTRACT

Systems and methods for scheduling tasks using sliding time windows are provided. In certain embodiments, a system for scheduling the execution of tasks includes at least one processing unit configured to execute multiple tasks, wherein each task in the multiple tasks is scheduled to execute within a scheduler instance in multiple scheduler instances, each scheduler instance in the multiple scheduler instances being associated with a set of time windows in multiple time windows and with a set of processing units in the at least one processing unit in each time window, time windows in the plurality of time windows having a start time and an allotted duration and the scheduler instance associated with the time windows begins executing associated tasks no earlier than the start time and executes for no longer (Continued)

than the allotted duration, and wherein the start time is slidable to earlier moments in time.

18 Claims, 14 Drawing Sheets

(56) References Cited

U.S. PATENT DOCUMENTS

| | | | |
|---|---|---|---|
| 7,207,042 B2 | 4/2007 | Smith et al. | |
| 7,302,685 B2 | 11/2007 | Binns et al. | |
| 7,886,283 B2 | 2/2011 | Nacul et al. | |
| 7,987,385 B2 | 7/2011 | Pruiett et al. | |
| 7,987,464 B2 | 7/2011 | Day et al. | |
| 7,996,644 B2 | 8/2011 | Kottapalli | |
| 8,387,052 B2 | 2/2013 | Dodge et al. | |
| 8,423,717 B2 | 4/2013 | Gray et al. | |
| 8,621,473 B2 | 12/2013 | Miller et al. | |
| 8,738,860 B1* | 5/2014 | Griffin | G06F 9/45558 711/122 |
| 8,875,146 B2 | 10/2014 | McCready et al. | |
| 8,943,287 B1 | 1/2015 | Miller et al. | |
| 8,984,527 B2 | 3/2015 | Backensto et al. | |
| 9,465,664 B1 | 10/2016 | Miller | |
| 9,639,401 B1 | 5/2017 | Bertram et al. | |
| 9,720,732 B1* | 8/2017 | Shih | G06F 9/4887 |
| 10,768,984 B2 | 9/2020 | Varadarajan et al. | |
| 2003/0088606 A1 | 5/2003 | Miller et al. | |
| 2003/0101084 A1 | 5/2003 | Otero Perez | |
| 2003/0135842 A1 | 7/2003 | Frey et al. | |
| 2003/0140333 A1 | 7/2003 | Odaka et al. | |
| 2005/0251806 A1 | 11/2005 | Auslander et al. | |
| 2006/0179196 A1 | 8/2006 | Gray | |
| 2006/0190943 A1 | 8/2006 | Haeri | |
| 2006/0206887 A1 | 9/2006 | Dodge et al. | |
| 2008/0028415 A1* | 1/2008 | Binns | G06F 9/4887 718/107 |
| 2008/0086734 A1 | 4/2008 | Jensen et al. | |
| 2008/0196031 A1 | 8/2008 | Danko | |
| 2009/0007123 A1 | 1/2009 | Sreedharan et al. | |
| 2009/0183163 A1* | 7/2009 | Maruyama | G06F 9/4881 718/103 |
| 2009/0217280 A1 | 8/2009 | Miller | |
| 2010/0030606 A1 | 2/2010 | Lee et al. | |
| 2010/0199280 A1 | 8/2010 | Vestal et al. | |
| 2011/0087815 A1 | 4/2011 | Kruglick | |
| 2011/0125539 A1 | 5/2011 | Bollapragada et al. | |
| 2011/0161964 A1 | 6/2011 | Piazza et al. | |
| 2012/0051369 A1 | 3/2012 | Bryan et al. | |
| 2012/0284732 A1 | 11/2012 | Griglock et al. | |
| 2013/0036421 A1 | 2/2013 | Miller et al. | |
| 2013/0036423 A1 | 2/2013 | McCready et al. | |
| 2013/0179616 A1 | 7/2013 | Accapadi et al. | |
| 2013/0205301 A1 | 8/2013 | Easwaran et al. | |
| 2014/0122848 A1* | 5/2014 | Easwaran | G06F 9/4887 712/E9.016 |
| 2014/0137122 A1 | 5/2014 | Egolf et al. | |
| 2014/0208331 A1 | 7/2014 | Li et al. | |
| 2014/0281088 A1 | 9/2014 | VanderLeest et al. | |
| 2014/0344819 A1 | 11/2014 | Kumar | |
| 2015/0067220 A1 | 3/2015 | Schwach et al. | |
| 2016/0246646 A1* | 8/2016 | Craciunas | G06F 9/4881 |
| 2016/0283272 A1 | 9/2016 | Coleman | |
| 2016/0364267 A1 | 12/2016 | Varadarajan et al. | |
| 2017/0308629 A1 | 10/2017 | Petras et al. | |
| 2019/0294472 A1 | 9/2019 | Varadarajan et al. | |
| 2021/0096903 A1* | 4/2021 | Sodagar | G06F 9/4881 |

FOREIGN PATENT DOCUMENTS

| | | |
|---|---|---|
| JP | 2004533667 A | 11/2004 |
| JP | 2011523142 A | 8/2011 |
| WO | 2014170569 A1 | 10/2014 |

OTHER PUBLICATIONS

Zhu et al ;Scheduling with Dynamic Voltage/Speed Adjustment Using Slack Reclamation in Multiprocessor Real-Time Systems; 15pages(Year: 2003).*
U.S. Patent and Trademark Office, "Advisory Action", U.S. Appl. No. 14/737,010, dated Sep. 27, 2017, pp. 1 through 5, Published: US.
U.S. Patent and Trademark Office, "Advisory Action", U.S. Appl. No. 14/737,010, dated Nov. 29, 2018, pp. 1 through 6, Published: US.
U.S. Patent and Trademark Office, "Advisory Action", U.S. Appl. No. 14/737,010, dated Dec. 18, 2019, pp. 1 through 2, Published: US.
U.S. Patent and Trademark Office, "Final Office Action", U.S. Appl. No. 14/737,010, dated Jul. 12, 2017, pp. 1 through 32, Published: US.
U.S. Patent and Trademark Office, "Final Office Action", U.S. Appl. No. 14/737,010, Oct. 2, 2019, pp. 1-33, Published: US.
U.S. Patent and Trademark Office, "Office Action", U.S. Appl. No. 14/737,010, dated Jan. 12, 2017, pp. 1 through 30, Published: US.
U.S. Patent and Trademark Office, "Office Action", U.S. Appl. No. 14/737,010, dated Jan. 15, 2020, pp. 1-33, Published: US.
U.S. Patent and Trademark Office, "Office Action", U.S. Appl. No. 14/737,010, dated Jan. 25, 2018, pp. 1 through 32, Published: US.
U.S. Patent and Trademark Office, "Office Action", U.S. Appl. No. 14/737,010, dated Feb. 27, 2019, pp. 1 through 28, Published: US.
U.S. Patent and Trademark Office, "Interview Summary", U.S. Appl. No. 14/737,010, dated May 25, 2018, pp. 1 through 3, Published: US.
"QNX Introduces Secure Partitioning for Multi-Core Processors", at least as early as Oct. 22, 2014, p. 1, http://www.qnx.com/news/pr_2314_1.html.
Barr, "Introduction to Preemptive Multitasking", Mar. 6, 2003, pp. 1 through 3, www.embedded.com/print/4024543.
Cronk, "Improve CPU Utilization with DEOS Slack RTOS Scheduling", Dated Sep. 28, 2009, pp. 1-68, Publisher: QNX Software Systems GmbH & Co. KG, Published in: Ottawa, CA.
DDC-I, "Deos, a Time & Space Partitioned, Multi-core Enabled, DO-178 DAL A Certifiable RTOS", "https://www.ddci.com/products_deos/", Retrieved on Dec. 13, 2017, pp. 1-4, Publisher: DDC-I, Inc., Published in: AZ.
Devadas et al., "Coordinated Power Management of Periodic Real-Time Tasks on Chip Multiprocessors", 2006, pp. 1 through 12, IEEE.
European Patent Office, "Communication pursuant to Article 94(3) from EP Application No. 19164199.2", from Foreign Counterpart to U.S. Appl. No. 15/928,656, dated Jun. 29, 2020, pp. 1 through 7, Published: EP.
European Patent Office, "Communication under Rule 71(3) EPC from EP Application No. 16171604.8", from Foreign Counterpart to U.S. Appl. No. 14/737,010, dated Oct. 4, 2019, pp. 1-48, Published: EP.
European Patent Office, "Extended European Search Report from EP Application No. 16171604.8", from Foreign Counterpart to U.S. Appl. No. 14/737,010, dated Nov. 8, 2016, pp. 1 through 10, Published: EP.
European Patent Office, "Extended European Search Report from EP Application No. 19164199.2 dated Jul. 18, 2019", from Foreign Counterpart to U.S. Appl. No. 15/928,656, pp. 1-9, Published: EP.
Huang et al., "An Isolation Scheduling Model for Multicores", 2015, pp. 1 through 12.
Israel Patent Office, "Office Action from Israel Application No. 246072", from Foreign Counterpart to U.S. Appl. No. 14/737,010, dated Nov. 28, 2019, pp. 1-8, Published: IL.
Jang et al., "A Time-Window-Based Task Scheduling Approach for Multi-Function Phased Array Radars", 2011 11th International Conference on Control, Automation and Systems, Oct. 2011, pp. 1250 through 1255, ICROS.
Japanese Patent Office, "Notice of Reason for Rejection from JP Application No. 2016-110545", from Foreign Counterpart to U.S. Appl. No. 14/737,010, dated Jan. 31, 2020, pp. 1-6, Published: JP.

(56) References Cited

OTHER PUBLICATIONS

Jiangnan et al., "A Hybrid Way to Solve the Task Scheduling Problem for Multi-Parallel Machines with Time windows", 2009 2nd International Conference on Power Electronics and Intelligent Transporlalion System, 2009, pp. 36 through 39, PEITS.

King, "Slack scheduling enhances multicore performance in safety-critical applications", DDC-I, Aug. 25, 2011, pp. 1 through 5, EDN Network.

Lee et al., "Controlling Preemption for Better Schedulability in Multi-Core Systems", 2012 IEEE 33rd Real-Time Systems Symposium, pp. 29 through 38, IEEE, IEEE Computer Society.

Logie et al., "Combinatorial Sliding Window Scheduling for Distributed Systems", 2003, pp. 630-635, IEEE.

Rose, "Memory Partitioning and Slack Scheduling Boost Performance in Safety-Critical Applications", "http://www.electronicdesign.com/embedded/memory-partitioning-and-slack-scheduling-boost-performance-safety-critical-applications-0", Dated Aug. 26, 2014, Retrieved Dec. 13, 2017, pp. 1-17.

Samolej, "ARINC Specification 653 Based Real-Time Software Engineering", e-Information Software Engineering Journal, 2009, pp. 1 through 12, vol. 3, Issue 1.

U.S. Patent and Trademark Office, "Advisory Action", U.S. Appl. No. 15/928,656, dated May 8, 2020, pp. 1 through 6, Published: US.

U.S. Patent and Trademark Office, "Final Office Action", U.S. Appl. No. 14/737,010, dated Oct. 2, 2019, pp. 1-33, Published: US.

U.S. Patent and Trademark Office, "Final Office Action", U.S. Appl. No. 15/928,656, dated Feb. 24, 2020, pp. 1-18, Published: US.

U.S. Patent and Trademark Office, "Office Action", U.S. Appl. No. 15/928,656, dated Jun. 24, 2020, pp. 1 through 15, Published: US.

U.S. Patent and Trademark Office, "Office Action", U.S. Appl. No. 15/928,656, dated Nov. 29, 2019, pp. 1 through 27, Published: US.

Wang et al., "Energy-aware dynamic slack allocation for real-time multitasking systems", Sustainable Computing: Informatics and Systems 2, Apr. 30, 2012, pp. 128-137, Elsevier.

Kim, "Strongly Partitioned System Architecture for Integration of Real-Time Applications", A Dissertation Presented to the Graduate School of the University of Florida In Partial Fulfillment of the Requirements For the Degree of Doctor of Philosophy, 2001, pp. 1 through 161, University of Florida.

European Patent Office, "Communication pursuant to Article 94(3) EPC from EP Application No. 19164199.2", from Foreign Counterpart to U.S. Appl. No. 15/928,656, dated Feb. 5, 2021, pp. 1 through 6, Published: EP.

National Intellectual Property Administration, P.R. China, "First Office Action from CN Application No. 201610595849.7", from Foreign Counterpart to U.S. Appl. No. 14/737,010, dated Aug. 27, 2021, pp. 1 through 26, Published: CN.

U.S. Patent and Trademark Office, "Certificate of Correction", filed in U.S. Pat. No. 10,908,955, signed Mar. 16, 2021, received Mar. 17, 2021, p. 1, Published: US.

U.S. Patent and Trademark Office, "Notice of Allowance", U.S. Appl. No. 14/737,010, dated May 1, 2020, pp. 1 through 21, Published: US.

U.S. Patent and Trademark Office, "Notice of Allowance", U.S. Appl. No. 15/928,656, dated Oct. 5, 2020, pp. 1 through 12, Published: US.

Japanese Patent Office, "Notice of Reason for Rejection from JP Application No. 2016-110545", from Foreign Counterpart to U.S. Appl. No. 14/737,010, dated Oct. 2, 2020, pp. 1 through 7, Published: JP.

National Intellectual Property Administration, P.R. China, "Second Office Action from CN Application No. 201610595849.7 dated Jan. 24, 2022", from Foreign Counterpart to U.S. Appl. No. 15/928,656, pp. 1 through 21, Published: CN.

* cited by examiner

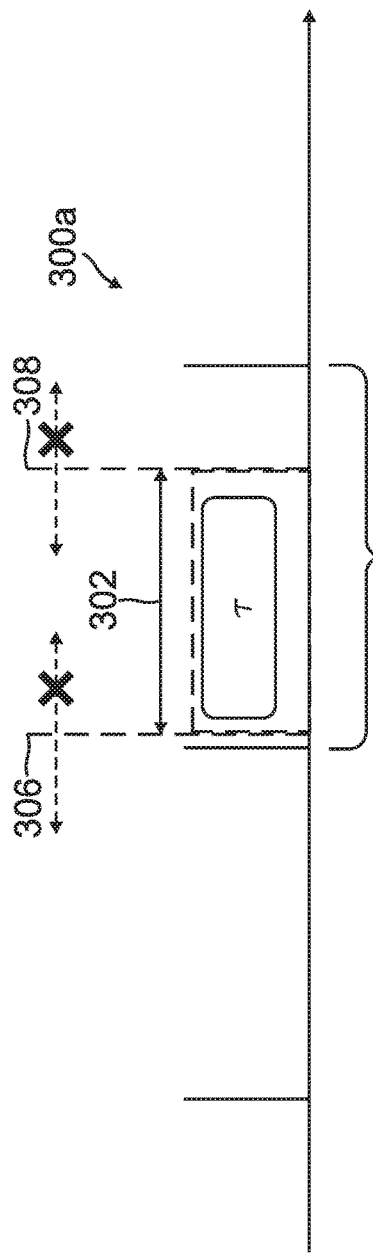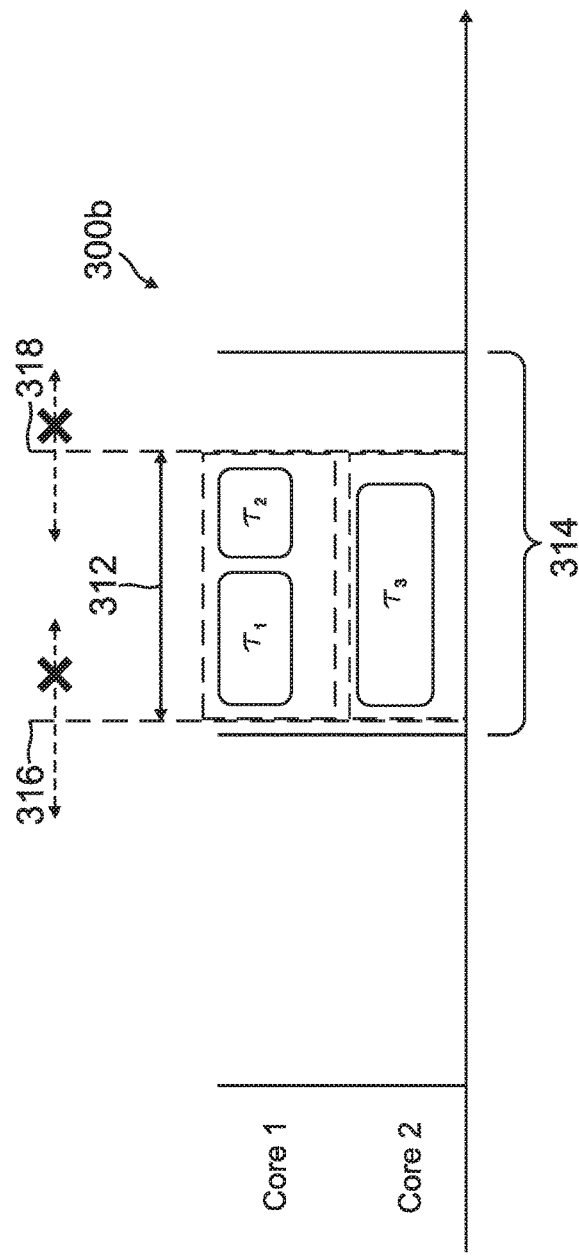
FIG. 3A
FIG. 3B

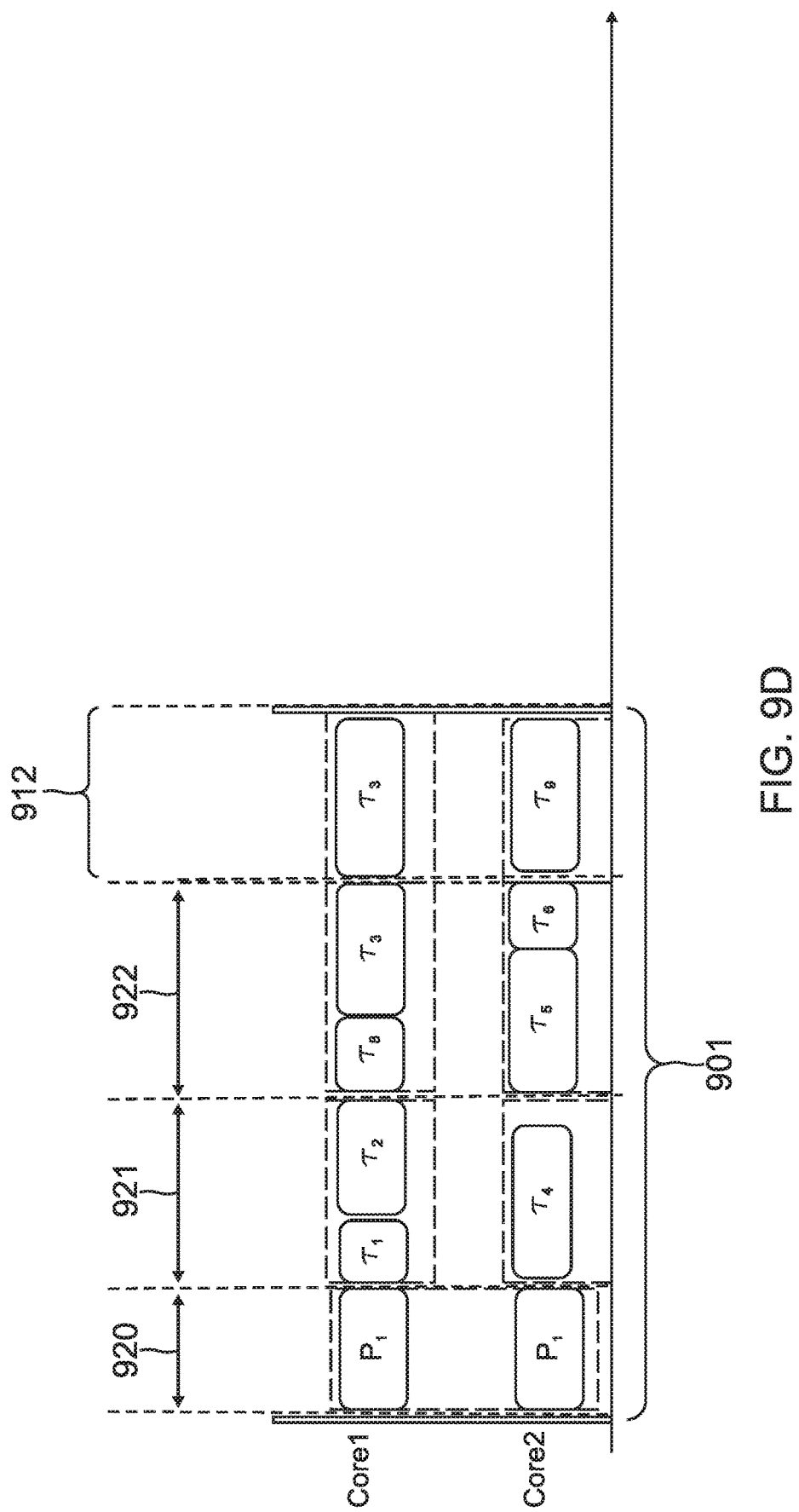

SYSTEMS AND METHODS FOR SCHEDULING TASKS USING SLIDING TIME WINDOWS

CROSS-REFERENCE TO RELATED APPLICATION

This application is a continuation of U.S. application Ser. No. 14/737,010, filed on Jun. 11, 2015 and titled "SYSTEMS AND METHODS FOR SCHEDULING TASKS USING SLIDING TIME WINDOWS", the contents of which is incorporated herein in its entirety.

BACKGROUND

Real-Time Operating Systems (RTOSs) in aerospace applications may rely on the concept of time partitioning in order to certify that the RTOS executes tasks within an identified worst case execution time. For example, one RTOS uses static fixed time window schedules. An alternative approach uses rate-monotonic (RM) scheduling and slack scheduling to provide greater flexibility for dynamic task execution while still maintaining time determinism.

In multi-core platforms, characterizing and bounding cross core interference is critical in determining the worst case execution time and therefore budgets, where the budgets form the basis for time partitions. However, in multi-core platforms, the schedulability of the multiple threads is not always guaranteed. Accordingly, in a multi-core RTOS, it is not always possible to provide multi-core RTOS mechanisms whereby a task-set executing on different cores is limited to satisfy time determinism yet also allowing flexibility and dynamism.

SUMMARY

Systems and methods for scheduling tasks using sliding time windows are provided. In certain embodiments, a system for scheduling the execution of tasks includes at least one processing unit configured to execute a plurality of tasks, wherein each task in the plurality of tasks is scheduled to execute within a scheduler instance in a plurality of scheduler instances, each scheduler instance in the plurality of scheduler instances being associated with a set of time windows in a plurality of time windows and with a set of processing units in the plurality of processing units in each time window, one or more time windows in the plurality of time windows having a start time and an allotted duration and the scheduler instance associated with the one or more time windows begins executing associated tasks no earlier than the start time and executes for no longer than the allotted duration, and wherein the start time is slidable to earlier moments in time.

DRAWINGS

Understanding that the drawings depict only exemplary embodiments and are not therefore to be considered limiting in scope, the exemplary embodiments will be described with additional specificity and detail through the use of the accompanying drawings, in which:

FIG. 3A is a diagram of a portion of a timeline of scheduled tasks within a sliding time window on a single processing unit in one embodiment described in the present disclosure;

FIG. 3B is a diagram of a portion of a timeline of scheduled tasks within a sliding time window on a multiple core processing unit in one embodiment described in the present disclosure;

FIGS. 9A-9D are diagrams of a timeline illustrating the identification and use of slack with sliding time windows in one embodiment described in the present disclosure;

Figure 1:
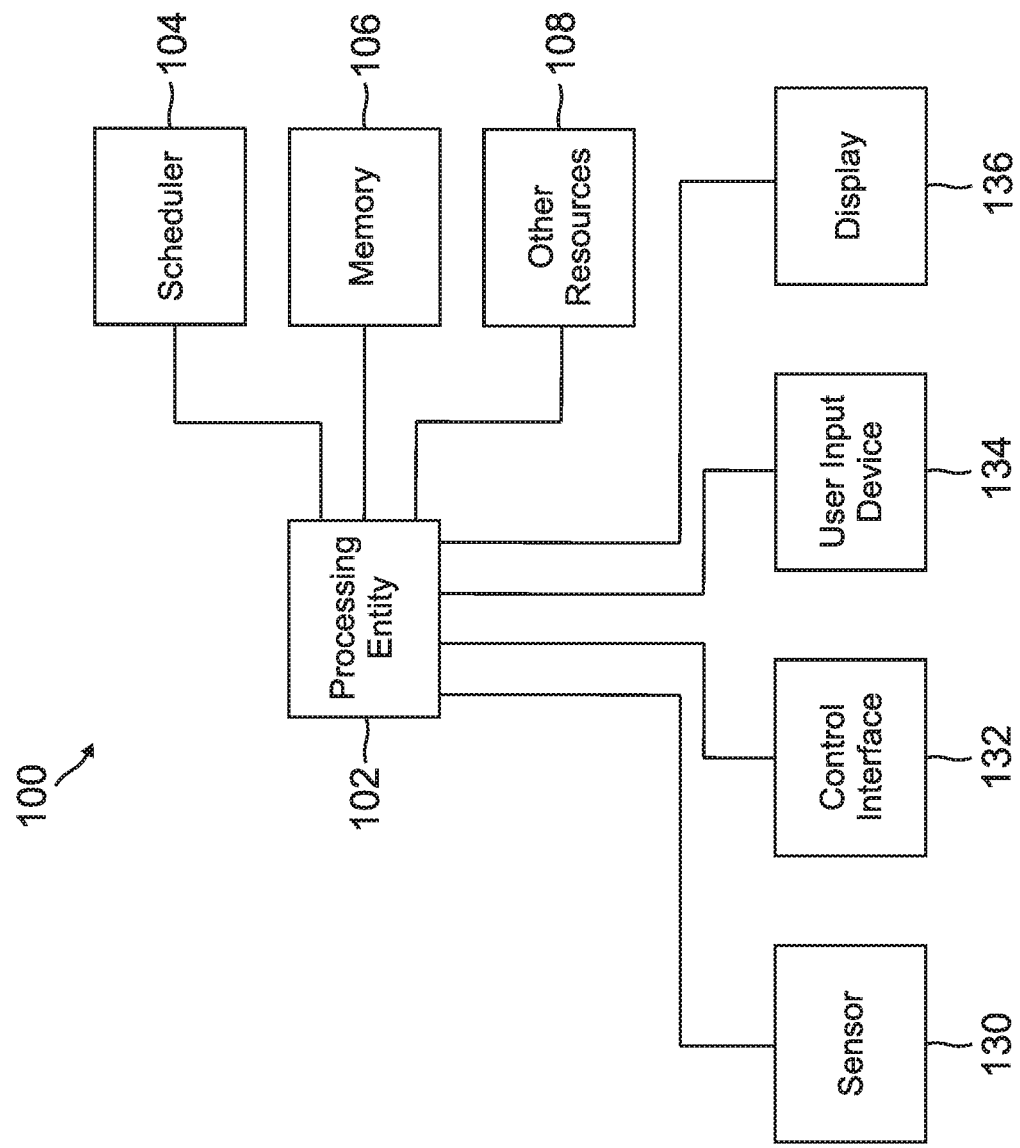
FIG. 1 is a block diagram of a system for executing tasks on at least one processing unit in one embodiment described in the present disclosure.

In accordance with common practice, the various described features are not drawn to scale but are drawn to emphasize specific features relevant to the exemplary embodiments.

DETAILED DESCRIPTION

In the following detailed description, reference is made to the accompanying drawings that form a part hereof, and in which is shown by way of illustration specific illustrative embodiments. However, it is to be understood that other embodiments may be utilized and that logical, mechanical, and electrical changes may be made. Furthermore, the method presented in the drawing figures and the specification is not to be construed as limiting the order in which the individual steps may be performed. The following detailed description is, therefore, not to be taken in a limiting sense.

In order to provide the flexibility to accommodate the desired dynamism while still retaining time guarantees, systems and methods for scheduling tasks using sliding time windows are provided. To implement the sliding time windows, tasks are scheduled into time windows using time partitioning. The time partitioning aids in meeting time guarantees at task level as well as time window level. Further, as described herein, the time windows are sliding time windows. A sliding time window is able to adjust the start time of the time window such that the tasks execute at an earlier moment in time while still maintaining time determinism. When embodiments implement sliding time windows, a system may also reserve time for execution of interrupt service routines. Further, slack scheduling may also be performed to permit full CPU utilization on all cores.

According to certain embodiments, FIG. 1 illustrates a system 100 that is able to implement sliding time windows, the sliding time windows are mentioned briefly above but are described in greater detail below. System 100 may generally be implemented in embedded systems, standard computing systems, and other implementations known to one having skill in the art. In at least one embodiment, system 100 uses an operating system (such as a real time operating system), where the operating system has scheduling requirements. As shown, system 100 includes a processing entity 102 coupled to a scheduler 104, a memory 106, and other resources 108. The processing entity 102 may be communicatively coupled to the scheduler 104, the memory 106, and the other resources 108.

The processing entity 102 may be a single processing unit or multiple processing units. The term "processing unit", as used herein, generally refers to a computational device capable of accepting data and performing mathematical and logical operations as instructed by program instructions. In the embodiment, where the processing entity 102 includes multiple processing units, the multiple processing units may be part of a multi-CPU system, a set of cores in a multi-core CPU, or a set of hyperthreads within a hyperthreaded processing unit. In one further example, the multiple processing units may be a multi-CPU system, where the different CPUs in the multi-CPU system have multiple cores. Further, each core may operate as a hyperthreaded processing unit. As used herein, the term "multi-core" will be used below to refer to implementations having multiple processing units as described above.

In the exemplary embodiment shown in FIG. 1, program instructions are stored (or otherwise embodied) on or in an appropriate non-transitory storage medium or memory 106 (such as flash or other non-volatile memory, magnetic disc drives, and/or optical disc drives). At least a portion of the program instructions are read from the memory 106 by processing entity 102 for execution on the processing entity 102. The program instructions are also referred to herein as "software". The memory 106 on or in which the program instructions are embodied may also be referred to here as a "program product." Although the memory 106 is shown in FIG. 1 as being local to the respective processing entity 102, it is to be understood that a remote memory 106 (for example, a storage media that is accessible over a network or through the cloud) and/or removable media may also be used. Memory 106 may also store program instructions (and any related data) during execution by the processing entity 102. Memory 106 comprises, in one implementation, any suitable form of random access memory (RAM) now known or later developed, such as dynamic random access memory (DRAM). In other embodiments, other types of memory are used. Further, in some exemplary implementations, where the processing entity 102 includes multiple processing units, each processing unit has a separate memory 106 dedicated to storing the program instructions during execution on the associated processing unit.

In a further exemplary embodiment shown in FIG. 1, system 100 includes other devices that facilitate the transmission and reception of information with an external system. For example, as shown in FIG. 1, system 100 includes a sensor 130, which senses external parameters (otherwise produces a signal or information indicative of some physical phenomenon) and transmits them to the processing entity 102 for use by the processing entity 102 (more specifically, the program instructions executing thereon). Further, system 100 includes a control interface 132. In this embodiment, when the processing entity 102 executes program instructions, the processing entity 102 will transmit electrical signals to the control interface 132 to control an external system connected to system 100. Also, in at least one exemplary embodiment, system 100 interacts with a user. To facilitate interaction with a user, system 100 may include at least one user input device 134 and a display 136. Each user input device 134 receives input from a user and transmits the input to the processing entity 102 for use by the processing entity 102 (more specifically, the program instructions executing thereon). Also, in this embodiment, processing cluster 102 outputs information for viewing by a user to the display 136, which displays the information for the user.

In at least one implementation, the system 100 includes a scheduler 104. The scheduler 104 schedules the execution of program instructions on the processing entity 102. In at least one embodiment, the scheduler 104 is a scheduler in an operating system that dynamically schedules the execution of program instructions. In another embodiment, the scheduler 104 schedules the execution of program instructions according to a static time definition. For example, when the operating system conforms to ARINC 653, the execution of program instructions is assigned to dedicated time windows. Further, when the processing entity 102 includes multiple processing units, each processing unit may have an associated scheduler 104.

As described herein, the program instructions, stored within the storage medium 104 may be organized into tasks. As used herein, the term "task" refers to an entity that is or identifies a group of program instructions that are associated with one another, that when executed accomplish a designated purpose. Tasks are scheduled for execution on the processing entity 102 by the scheduler 104. Each instance when a task is scheduled for execution is referred to herein as a scheduled instance of a Task. Further, a task may be composed of smaller sub-tasks that execute within a scheduled instance of the task. In certain exemplary implementations, a task may be applied to a rate monotonic thread, a POSIX thread, or an ARINC 653 process.

In certain embodiments, multiple task instances may be scheduled for execution within a scheduler instance. A scheduler instance may be tied to a single core or multiple cores. When the scheduler instance is tied to multiple cores, a scheduling algorithm may select the core on which threads associated with the multi-core scheduler instance execute. If no scheduler instance is associated with a core in a time window, tasks may not be allowed to execute on the unscheduled core during the time window. Within a major frame, there may be multiple scheduler instances, however, each task may be handled by a single scheduler instance for the entire major frame.

In certain implementations, where the processing entity 102 includes multiple processing units, the scheduler 104 determines which processing unit in the processing entity 102 will execute a particular task. Also, the scheduler 104 determines, at any given point in time, which tasks are to be executed on each processing unit in the processing entity 102. In determining how to schedule the execution of tasks, the scheduler 104 uses a scheduling algorithm or other scheduling policy that provides rules and methods for determining how to schedule the execution of tasks. For example, the scheduler 104 may use scheduling algorithms such as rate monotonic, priority preemptive, round robin, and the like. In one implementation of such an embodiment, the scheduler 104 uses a single scheduling algorithm for scheduling the execution of the tasks on the various processing units within the processing entity 102. In another implementation, the scheduler 104 uses multiple scheduling algorithms for scheduling the execution of the tasks on the different processing units within the processing entity 102. For example, in such alternative implementations, the scheduler 104 uses a first scheduling algorithm to schedule some of the tasks for execution on a first processing unit and a second scheduling algorithm for scheduling the execution of some of the tasks for execution on a second processing unit within the processing entity 102.'

In at least one embodiment, the scheduling of tasks and time windows is performed in such way that time determinism is achieved. Time determinism may be achieved in at least two different ways. For example, time determinism may be achieved on a per task basis by guaranteeing budgets in the context of rate monotonic scheduling where each task is a rate monotonic thread. In this example, both the time windows and the tasks that execute within the time windows may be time partitioned. Alternatively, time determinism may be achieved on a time window basis by allotting budgets solely to the time windows as a whole. For example, the time window may be a time partitioned entity and also a container for non-time partitioned tasks. For example, with applications based on ARINC 653, time determinism may be achieved at the ARINC 653 partition level where a budget is guaranteed for a group of tasks. Accordingly, the budget is enforced at the time window level while within the time window budgets are not allotted for the individual ARINC 653 tasks.

In at least one exemplary embodiment, the scheduler 104 schedules tasks in a time partitioned operating system. When the scheduler 104 schedules tasks in a time partitioned operating system, the scheduler 104 allots a processing budget to the tasks that execute on the processing entity 102. The allotted processing budget defines a period of time during which a task is allowed to execute on the processing entity 102. Further, scheduler 104 allots processing budgets to tasks that allow tasks to complete execution in either continuous or non-continuous time intervals. For example, when a task completes execution in a continuous time interval, the scheduler 104 allots a processing budget for the execution of the task that is sufficiently long enough in duration to allow the execution of the task to complete without interruption. Alternatively, when a task completes execution in non-continuous time intervals, the scheduler 104 allots non-continuous processing budgets for the respective execution of tasks where anon-continuous processing budget allows sufficient time for the completion of the execution of the associated task.

Further, as described below in greater detail, the scheduler 104 may include two-levels of schedulers. For example, scheduler 104 may include a time window scheduler and a task instance scheduler. When the scheduler 104 functions as a time window scheduler, the scheduler 104 schedules time windows having specified start and end times or, in other implementations, a specified start time and a specified duration, where a time window is a portion of time in which specified tasks are scheduled for execution. As the time window scheduler schedules the beginning and duration of time windows, the time window scheduler is able to guarantee that time windows begin and end within a specified time. In certain embodiments where tasks execute periodically, time windows are scheduled during a major frame, where a major frame is a period of time during which tasks execute for each of the scheduled time windows. The major frame representing the period of time for the task having the largest period. As such, each time window may be scheduled within each major frame at the same time offset within different major frames. Further, in certain embodiments, the major frame may be segmented into smaller periods of time based on a task or tasks having the smallest period of time. The smaller period of time may be referred to as a minor frame. In certain embodiments, there may be multiple time windows scheduled during a major frame. The different time windows form a time windows sequence. When the last time window in the time window sequence finishes, the time window scheduler begins scheduling the time window sequence again, beginning with the first time window in the time window sequence. In embodiments where the processing entity 102 includes multiple cores, the time window scheduler may synchronize the start times and durations of the time windows on the multiple cores. In further embodiments, where the scheduler 104 is a task instance scheduler, the scheduler 104 assigns instances of task execution to execute within a scheduler instance window within a specified time window. The use of a time window scheduler and a task instance scheduler are described in greater detail below.

Figure 2:
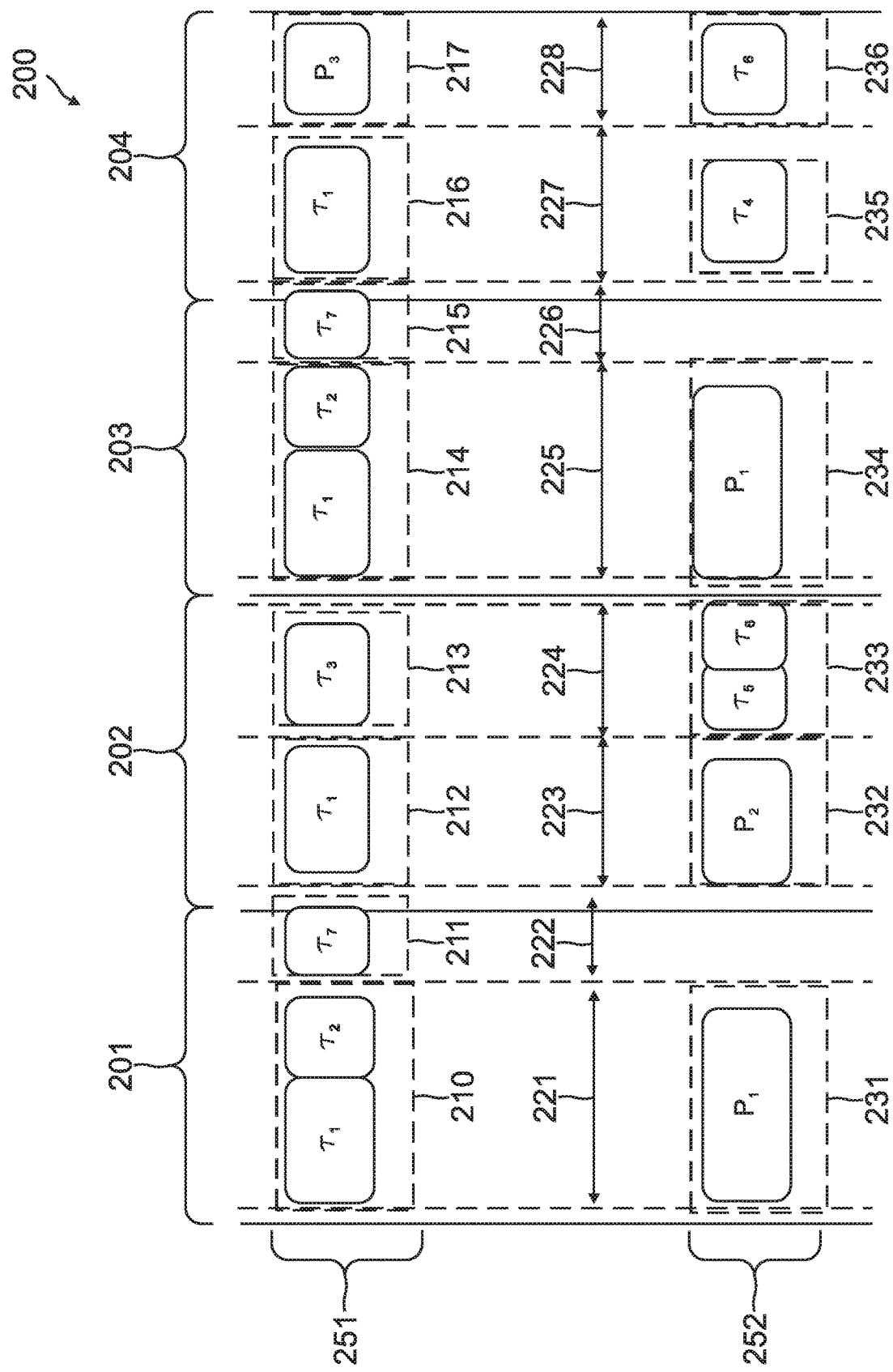
FIG. 2 is a diagram of a timeline of scheduled tasks in one embodiment described in the present disclosure.

FIG. 2 illustrates an execution timeline 200 for the execution of tasks on a multi-core processing system, though the principles discussed with relation to FIG. 2 apply to a single core operating system as well. The illustrated timeline shows only a portion of a major frame. For example, the execution schedule associated with a major frame may repeat at a frequency of 1 Hz, where one having skill in the art would realize that the frequency of repetition may be less or greater. Within the major frame, there may be multiple minor frames, where execution within a minor frame begins at a particular frequency. In one exemplary implementation, the beginning of each of the minor frames occurs at a frequency of 80 Hz. As such, execution within the different minor frame may begin every 12.5 ms, in other implementations, the minor frames can begin at a quicker or slower frequency. As shown in FIG. 2, there are four different minor frames that are identified as minor frames 201-204. Within the minor frames 201-204, different instances of task execution are scheduled to execute within the scheduled time windows. Alternatively, some embodiments may have a single frame where the minor frame equals the major frame.

In at least one implementation and as illustrated in the example shown in FIG. 2, there are eight different time windows 221-228 scheduled within the minor frames 201-204. As discussed above with relation to scheduler 104, the different time windows 221-228 execute at the same time within each major frame. In certain implementations, task instances within a particular time window are constrained to execute within a single minor frame. Alternatively, task instances associated with a particular time window may begin execution within a first minor frame and stop execution within a second minor frame. As shown in FIG. 2, the span of the time windows is substantially constrained to a single minor frame. Further, as shown in FIG. 2, the timeline 200 shows the task scheduling for two different processing cores 251-252. The time windows 221-228 span the different cores 251-252.

In certain implementations, the schedule consists of scheduler instances that schedule the execution of tasks on one or more cores within a set of time windows. Hence, within a time window each core is associated with a particular scheduler instance. The interval where a particular schedule instance is active within a time window is a scheduler instance window. Scheduler instance windows 210-217 and 231-236 represent scheduler instance windows within the various time windows 221-228. As illustrated each scheduler instance window is assigned to a core in a particular time window. For example, on core 251, scheduler instance windows 210-217 execute different tasks than the tasks executed in scheduler instance windows 231-236 on core 252. Further, different types of tasks may execute within the scheduler instance windows 231-236 on core 252 when compared to the scheduler instance windows 210-217 that are assigned to core 251. In embodiments where different types of tasks execute like ARINC 653 tasks, POSIX tasks, rate monotonic tasks, interrupt tasks, and the like; the different tasks that execute within a particular scheduler instance window may be constrained to be of the same type of task. For example, tasks $\tau_1$, $\tau_2$, $\tau_3$, and $\tau_4$ may be rate monotonic tasks scheduled to execute within scheduler instance windows 210, 212-214, 216 and 235, which are designated for the execution of rate monotonic tasks. Tasks $P_1$, $P_2$, and $P_3$ are ARINC 653 tasks scheduled to execute within ARINC 653 scheduler instance windows 217, 231, 232, and 234. Further, tasks $\tau_5$, $\tau_6$, and $\tau_7$ are POSIX tasks scheduled to execute within POSIX scheduler instance windows 211, 215, 233, and 236.

In previous systems, the different time windows are fixed in relation to the timeline 200. When a time window is fixed, the beginning of the time window is prevented from sliding either earlier or later on the timeline. Thus, tasks associated with a fixed time window are not allowed to begin execution either before the start time of the fixed time window or continue executing after the end of the fixed time window as determined by the duration of the fixed time window from the start time. Further, the budget allotted to the fixed time window prevents tasks associated with other time windows from executing during the fixed time window. Essentially, when a time window is fixed, the fixed time window is guaranteed not to slide on the timeline. The fixing of time windows for a group of executing tasks aids in determining the worst case execution time for the group of executing tasks.

However, when assigning tasks to fixed time windows, the scheduler may not support dynamism as the tasks and sub-tasks may be statically defined. For example, the pre-configured budgets and maximal execution time may be explicitly statically scheduled and configured on the time line. Accordingly, a scheduler is prevented from dedicating extra time to the completion of tasks such that the scheduler is unable to support the scheduling of additional budget and execution times even if time is available because of a gap on a scheduling time line before the beginning of the next fixed time window is scheduled. Accordingly, because of the lack of dynamism, the timeline may be utilized inefficiently.

In further embodiments, a scheduler needs to be able to schedule interrupt service routines. Interrupt service routines are dynamic by nature and need to be executed when interrupts occur. When a scheduler uses fixed time windows, there are generally two ways to support the scheduling of interrupt service routines. One way to support interrupt service routines is through what is called a "sampling approach." In the sampling approach, interrupt service routine tasks are scheduled explicitly at fixed points in time. The fixed time scheduling of interrupt routine tasks may cause either increased latency (fewer scheduled times) or increased computational resources than executing the interrupt routine at the point where the interrupt is raised by hardware. A second way to support interrupt service routines may be referred to as the "All tasks interrupt service routine augmented approach" (hereinafter referred to as the "augmented approach"). In the augmented approach, tasks and potential gaps of unscheduled time on a timeline are padded or additionally augmented with a budget for executing interrupt service routines. Accordingly, whenever an interrupt occurs, the latency is reduced as the interrupt service routine will be the next scheduled task. The augmented approach has the advantage of none or minimal latency. However, by allotting multiple interrupt service routine budgets within a period there is the potential to incur a wasted processor utilization penalty, where the processor sits idle for significant portions of the timeline.

In certain embodiments, to more effectively utilize the abilities of the processor, the scheduler may implement sliding time windows. The phrase "sliding time window," as used herein, generally refers to a scheduled time window that can either begin execution at an earlier time than the pre-configured beginning of the time window or stop execution earlier than the derived end of the time window based on the pre-configured duration for the time window. FIGS. 3A and 3B illustrate the concept of a sliding time window. FIG. 3A illustrates a sliding time window on a timeline 300a that is scheduled to execute on a single processing unit. FIG. 3B illustrates the implementation of sliding time windows on a timeline 300b for multiple cores. In FIG. 3A, the pre-configured time window 302 is assigned to execute within the minor frame 304. However, the pre-configured time window 302 may execute at any moment within the major frame, in particular, when the major frame is equal to the minor frame. The task $\tau$ is able to execute during the pre-configured time window 302. As time window 302 is a sliding time window, the pre-configured beginning 306 of the time window 302 is able to slide to an earlier point in the timeline. However, the pre-configured beginning 306 of the time window 302 is unable to slide to a later point in the timeline. Further, when the beginning 306 of the time window 302 slides to an earlier point in time, the derived end 308 of the time window 302 also slides to an earlier point in the timeline 300a based on the pre-configured duration for the time window 302. However, like the beginning 306, the end 308 is generally unable to slide to a later point in the timeline. In certain implementations, when the tasks associated with the time window 302 finish execution before the derived end time based on the pre-configured duration of the time window 302, the end time 308 may slide to an earlier moment in time.

FIG. 3B is similar to FIG. 3A with the exception that FIG. 3B illustrates the scheduling of a pre-configured time window on multiple cores. As discussed above, a time window, such as pre-configured time window 312, spans the multiple cores within the minor frame 314. Tasks $\tau_1$, $\tau_2$, and $\tau_3$ are scheduled to execute within the time window 312. As described above, pre-configured time window 312 is a sliding time window, the pre-configured beginning 316 of the time window 312 is able to slide to an earlier point in the timeline. However, the pre-configured beginning 316 of the time window 312 is unable to slide to a later point in the timeline. Further, the derived end 318 of the time window 312 is also able to slide to an earlier point in the timeline when the beginning 316 slides to an earlier point in time. As the beginning 316 of the time window 312 is unable to slide to a later moment in time, the derived end 318 is unable to slide to a later point in the timeline 300b. In certain implementations, when the beginning 316 slides, the end 318 also slides by the same amount of time. In certain implementations, when the tasks associated with the time window 312 finish execution before the derived end time based on the pre-configured duration of the time window 312, the end time 308 may slide to an earlier moment in time.

In certain implementations, there may be restrictions on how far a time window can slide based on the periodicity of tasks associated with the scheduler instances within a time window. For example, a periodic task is unable to begin execution before the beginning of the associated period. Certain systems may have a system integrator that configures the start times and durations of time windows based on the rate and/or period of tasks. In implementing sliding time windows, there are at least two approaches that may be implemented to take the possible restrictions into account. In a first approach, the beginning of a time window may be allowed to slide to a time before the beginning of a minor frame provided the new window start time does not cause a period violation for the task with the smallest period within the scheduler instances associated with the time window. A period violation occurs when the slide will result in the execution of a periodic task before the beginning of the period associated with the task. In a second approach, the beginning of time windows may be prevented from sliding to times that precede the beginning of the minor frame associated with the pre-configured time window.

Figure 4:
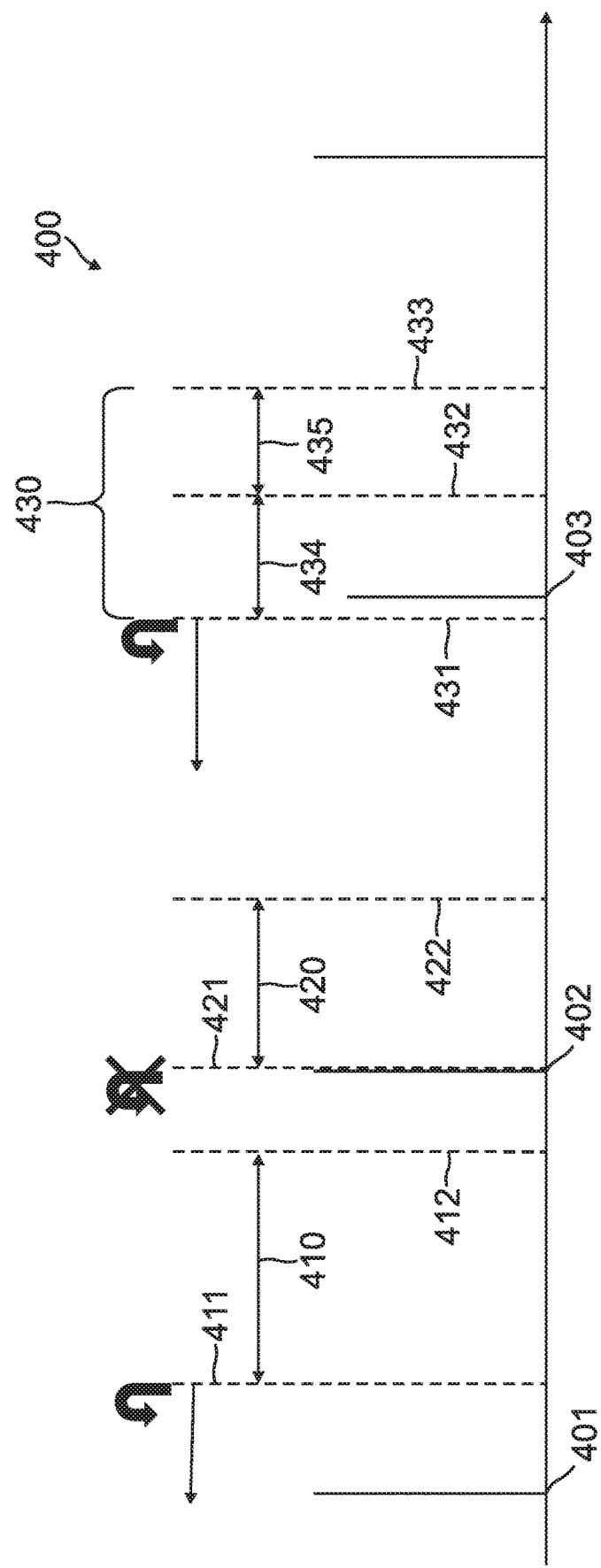
FIG. 4 is a diagram of a timeline illustrating a combination of sliding time windows and fixed time windows in one embodiment described in the present disclosure.

FIG. 4 is a diagram of a timeline 400 that illustrates the restrictions that arise due to the periodicity associated with the tasks that execute within the time windows. Timeline 400 includes both fixed time windows and slidable time windows. To illustrate the restrictions, three different time windows 410, 420, and 430 are scheduled to execute along the timeline 400. The first time window 410 has pre-configured beginning 411 and derived end 412. The beginning 411 of the first time window 410 is able to slide to an earlier point in time as long as it is at or after the earliest periodic start time 401. The derived end 412 is also able to move to an earlier moment in time based on the pre-configured duration of the time window 410, the beginning 411, and the amount of time in the time window consumed by the executing tasks. The second time window 420 has pre-configured beginning 421 and derived end 422, where the tasks executing within scheduler instances associated with the second time window 420 have an earliest start time 402. As the pre-configured beginning 421 is already aligned with the earliest start time 402, the beginning 421 is not slidable to an earlier moment in time and the derived end 422 of the second time window 420 is only slidable to an earlier time when the tasks executing within scheduler instances associated with the second time window 420 finish execution before the allotted processing budget is consumed. The third time window 430 has pre-configured beginning 431 and a derived end 433. As illustrated, the third time window 430 includes one or more tasks, represented as first portion 434. Also, the third time window 430 includes one or more tasks, represented as second portion 435, the tasks in the second portion 435 are constrained by periodicity requirements such that the periodically constrained tasks in the third time window 430 are unable to execute before the earliest start time 403. Accordingly, a system integrator may slide the time window 430 to an earlier point along the timeline up until the second portion start time 432 is equal to the earliest start time 403.

As time windows are slidable, the scheduler may handle interrupt service routines using methods other than the sampling approach and the augmented approach discussed above. To handle an interrupt, the scheduler schedules tasks within an interrupt service routine (ISR) time window. In scheduling, the start time and duration of the ISR time window indicate where budgets for the ISR handling routines are reserved or replenished on the timeline. In certain implementations, upon startup of the system, ISR scheduling instances are provided an execution budget to periodically handle interrupts that arise. As described herein below, ISR time windows do not necessarily indicate start times and durations of a time window when an ISR task executes. An ISR time window is a notional or logical time for reserving budgets for servicing interrupts. The execution of ISRs may be specified by a rate/period and budget for execution. Thus a start time and duration for an ISR time window may ensure that budgets are explicitly scheduled at a particular rate so that the multiple cores are not over scheduled, where "over scheduled" means that that the allocated time budgets exceed the available computing time. Further, ISR budgets may be reserved within a time window before the subsequent sliding time windows and fixed time windows are scheduled. Further, in one implementation, the ISR time window may be reserved for servicing ISRs after scheduler instances associated with other time windows are scheduled for execution.

When implemented, an actual interrupt associated with an ISR may occur at any point along a scheduled time line such that the interrupt may occur before an ISR scheduling instance, during the scheduling instance, or after the scheduling instance. If the interrupt occurs within an actively executing sliding time window other than the ISR time window then the scheduler may pre-empt the execution of tasks within the current sliding time window (i.e. stop all scheduler instances and associated tasks running in the current sliding time window or only stop tasks executing on a particular core). After pre-empting the execution of tasks within the current sliding time window, the system may execute the ISR time window scheduler instances and associated ISR tasks that have budgets. If the system is a multi-core system, the system executes ISR time window scheduler instances and associated ISR tasks having budgets on one or more of the multiple cores. In at least one implementation, budgets are allocated for the execution of ISRs prior to the occurrence of an interrupt the ISR is to handle. The ISR tasks are then allowed to execute until the ISR tasks complete execution or the budget is exhausted. If the execution of the ISR tasks preempted an actively executing sliding window, then tasks associated with the pre-empted sliding window will recommence execution after the ISR tasks complete execution or the budget is exhausted. If the execution of the ISR tasks occurred within a gap, then the ISR tasks execute until the ISR tasks complete or until the budget is exhausted, then execution proceeds with the next sliding window on the scheduling timeline.

Figure 5A:
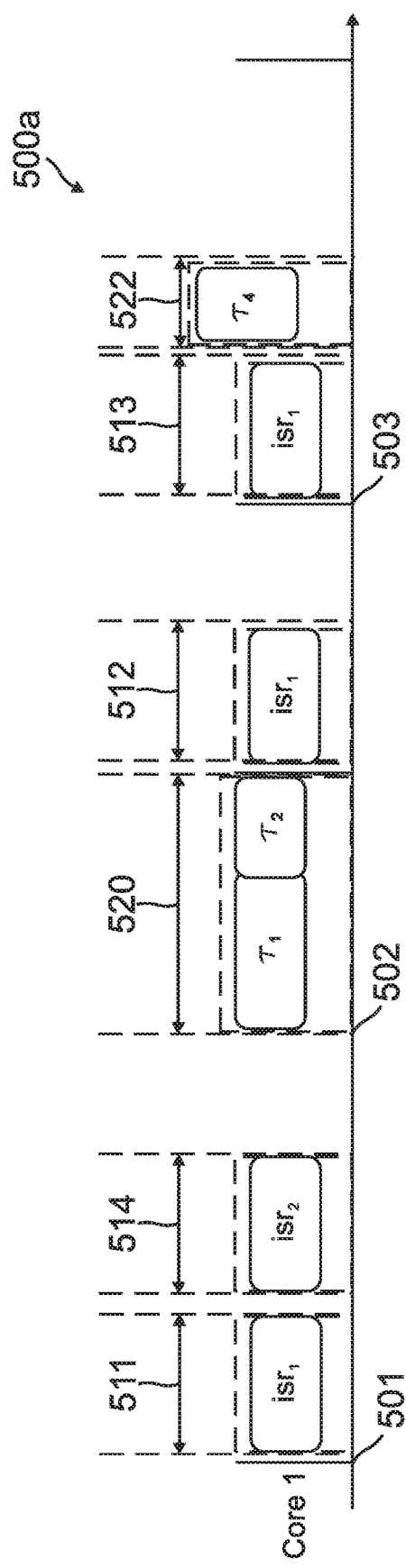
FIG. 5A is a diagram of a timeline illustrating the scheduling of interrupt service routine time windows on a single processing unit in one embodiment described in the present disclosure.
Figure 5B:
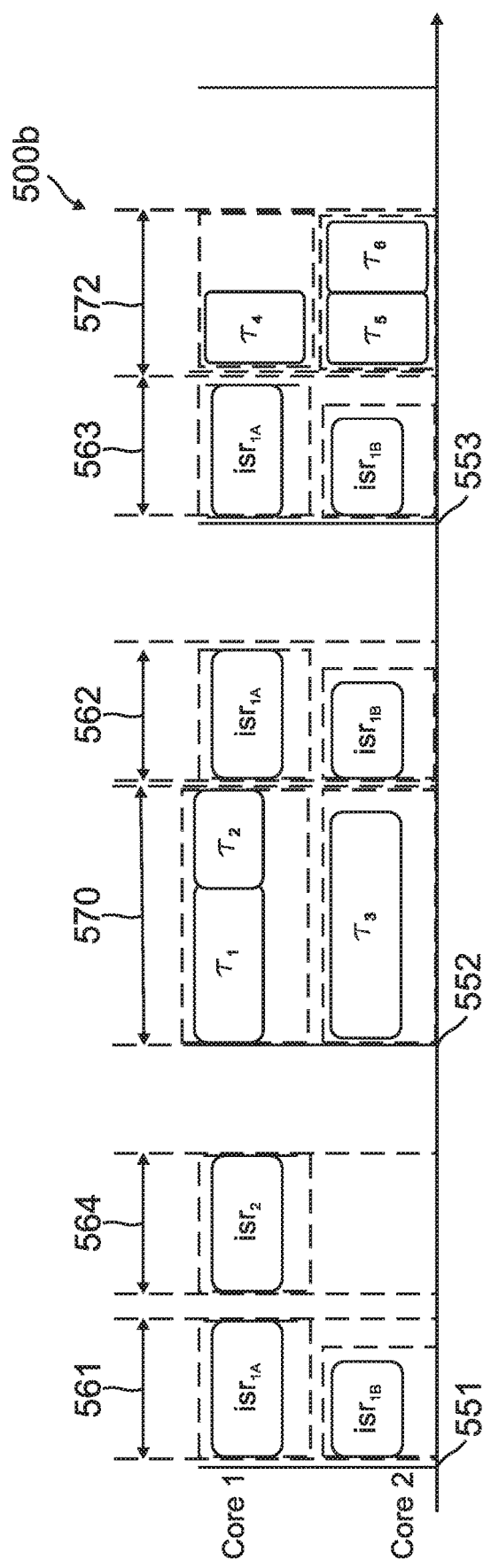
FIG. 5B is a diagram of a timeline illustrating the scheduling of interrupt service routine time windows on a multiple processing units in one embodiment described in the present disclosure.

FIGS. 5A, 5B, and 6A-6C illustrate the scheduling of ISR time windows on the timeline in the context of slidable time windows. In particular, FIGS. 5A and 5B illustrate the pre-allotment of start and end times for ISR threads on timelines 500a and 500b. FIG. 5A illustrates the reservation of budgets on a timeline 500a scheduled for execution by a single core processor and FIG. 5B illustrates the reservation of budgets on a timeline 500b scheduled for execution by a multi-core processor. As shown in FIG. 5A, the timeline 500a illustrates the scheduling of four different ISR time windows for handling interrupts that may occur. As illustrated, three of the ISR time windows 511, 512, and 513 are periodically scheduled with the three ISR time windows respectively being associated with a different earliest start time 501, 502, and 503. The three ISR time windows 511, 512, and 513 are allotted budgets to be serviced after a respective earliest start time 501, 502, and 503. Time windows 520 and 522 are standard time windows in which non-interrupt tasks execute. The first ISR time window 511 is scheduled to handle interrupts that occur between the first earliest start time 501 and the second earliest start time 502. Interrupts that arise after the first earliest start time 501 and before the second earliest start time 502 may be executed to consume the allotted budget to the first ISR time window 511. The second ISR time window 512 is scheduled after the time window 520, where both are limited to execution after the second earliest start time 502 and constrained to end execution before the third earliest start time 503. Further, the third ISR time window 513 is allotted time for servicing ISRs before the scheduling of tasks in time window 522. As shown, if the ISRs finish execution before the allotted time is exhausted, the time window 522 may slide to an earlier point in time up to the earliest start time 503. In a further implementation, a fourth ISR time window 514 may be scheduled immediately after ISR time window 511. The fourth ISR time window 514 may be used to service interrupts other than interrupts serviced by the three ISR time windows 511, 512, and 513.

As illustrated in FIG. 5B, where the timeline 500b shows earliest start times 551, 552, and 553, the ISR time windows 561, 562, and 563, and the time windows 570 and 572 span the different cores and are respectively scheduled similarly to the ISR time windows 511, 512, and 513, and the time windows 520 and 522. Further, as illustrated in FIG. 5B, more than one ISR can respectively be serviced on the different cores within a time window. For example, within each of the ISR time windows 561, 562, and 563, $ISR_{1A}$ is serviced on core 1 and $ISR_{1B}$ is serviced on core 2. When different ISRs are serviced on different cores within a time window, a scheduler may be restricted to servicing parallel ISRs or ISRs that can be concurrently executed to service the same underlying interrupt. For example, in one implementation, like ISR time window 514, an ISR time window 564 is allotted to servicing a different interrupt. When servicing interrupts, the ISR time window 564 may be restricted to servicing interrupts on a single core without being required to service interrupts on the other cores Further, multiple occurrences of the same interrupt in the interval between the window that provides budget to the ISR window, and the next window that is constrained to not start early may be serviced with execution time up to the specified budget for ISRs within the interval. If there is no more remaining budget within the interval, further ISRs may not be serviced until a new budget is allotted for the servicing of ISRs. If there is no more remaining budget within the current period, the ISRs may not be serviced until a new budget is allotted for the servicing of ISRs.

Figure 6A:
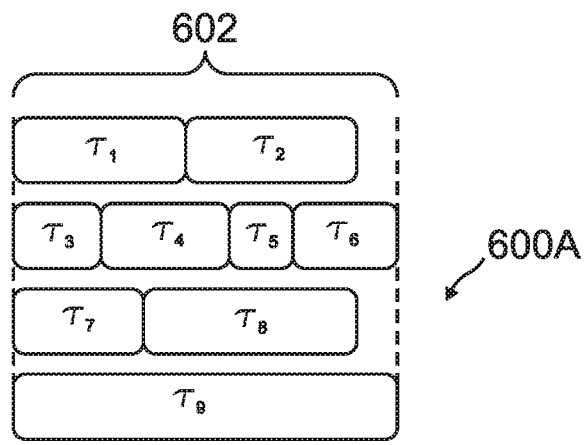
FIGS. 6A-6C are diagram of a portion of a timeline illustrating different embodiments for the preemption of a time window by an interrupt service.
Figure 6B:
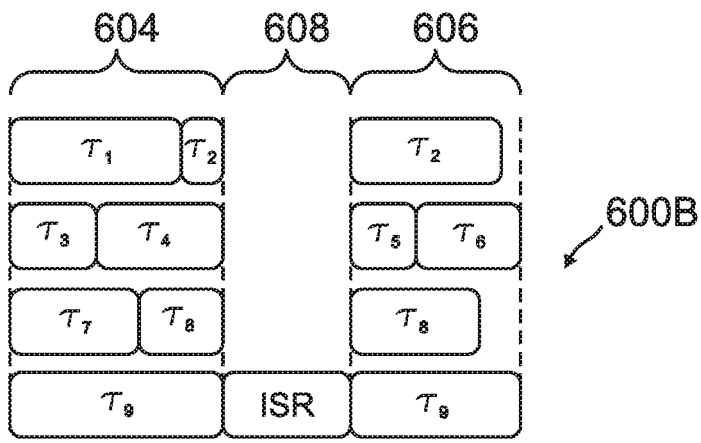
Figure 6C:
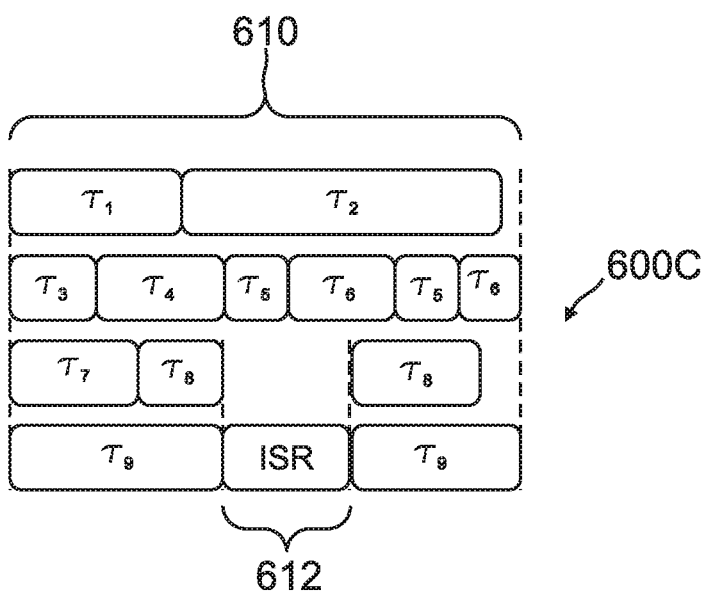

FIGS. 6A-6C illustrate the various embodiments for the preemption of executing tasks within a time window. FIG. 6A illustrates a time window 602 before an ISR is serviced. As illustrated, there are 9 different tasks, $\tau_1$-$\tau_9$, executing on four different cores. In particular, $\tau_1$ and $\tau_2$ execute on a first core, $\tau_3$-$\tau_6$ execute on a second core, $\tau_7$ and $\tau_8$ execute on a third core, and $\tau_9$ executes on a fourth core. In the absence of an interruption, the tasks execute normally within the time window 602.

FIGS. 6B and 6C illustrate different implementations for preempting the execution of tasks during the execution of time window 602. For example, FIG. 6B illustrates an implementation where an ISR preempts the execution of tasks on each of the cores. In particular the time window 602 is effectively divided into two separate time windows, a first time window 604 preceding the servicing of the ISR by an ISR time window 608 and a second time window 606 following the servicing of the ISR by the ISR time window 608. As illustrated, when servicing the ISR, a particular ISR may only execute on a single core while the other cores become inactive. If there are more than one ISR, the different ISRs may execute on a corresponding number of different cores or execute on a single core.

In contrast to FIG. 6B, FIG. 6C illustrates an implementation where an ISR preempts a portion of the tasks executing on the multiple cores. As illustrated, an ISR time window 612 may be created that preempts the execution of tasks $\tau_8$ and $\tau_9$ on the third and fourth cores. However, the tasks executing on the first and second cores are not preempted. In this example, in order to provide enough execution time to the preempted tasks so that they can complete their execution, the time window 602 is extended to account for the time allotted to the ISR time window 612. Thus, the tasks executing on the first and second cores will have extended time in which they may execute. If the tasks executing on the first and second cores are slack requesters (described in more detail below), the tasks will be able consume the extended time due to the additional time from the ISR time window 612 and the tasks executing on the third and fourth cores will be able to complete execution.

As described above, when ISR time windows are pre-configured to periodically handle occurring interrupts, irrespective of when the interrupts associated with the ISR time windows occur and are serviced pre-empting the corresponding active sliding windows, the sliding windows will be able to complete execution within the desired time.

In certain embodiments, sliding time windows may provide the option to be configured with an additional parameter that defines the earliest start time, where the earliest start time occurs before a defined pre-configured start time and a sliding window can slide to an earlier point in time between earliest start time and pre-configured start time but not before earliest start. As the earliest start time is the earliest start time for a sliding time window, at run time the tasks associated with a time window will begin executing at a time between the earliest start time and the pre-configured start time. In at least one exemplary implementation, the defining of earliest start times may prevent the execution of tasks before computer resources, such as Input/Output, are ready for the execution of the tasks. Also, the defining of earliest start times may prevent a time window from sliding to an earlier time that breaks periodicity.

Figure 7:
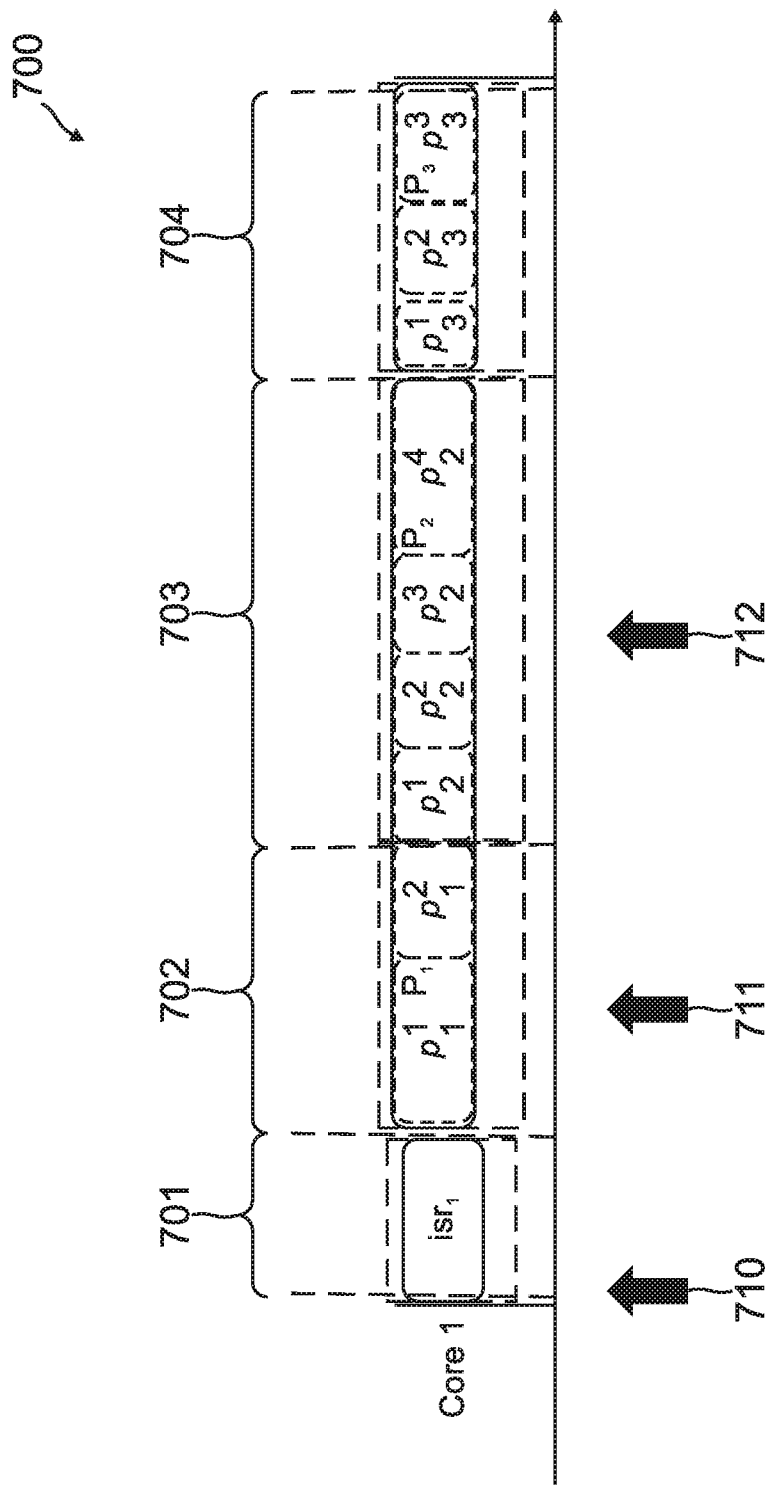
FIG. 7 is a diagram of a timeline illustrating the defining of earliest start times for multiple time windows in one embodiment described in the present disclosure.

FIG. 7 illustrates a timeline 700 for several time windows 701-704, where time windows 702-704 have respectively defined earliest start times 710-712. The first time window 701 is an ISR time window and the earliest start time corresponds to the pre-configured start. The second time window 702 has an earliest start time 710 that corresponds with the earliest start time of the ISR time window. In the event that there are no interrupts to service the second time window 702 may slide to at least the earliest start time 710 to begin execution of any associated tasks. The third time window 703 has an earliest start time 711 and the fourth time window has an earliest start time 712. In at least one implementation, the difference between the earliest start time and the start time for each of the tasks is equal to or greater than the budget allotted to the ISR time window to allow sufficient time for the servicing of interrupts in the event an interrupt occurs.

Slack scheduling has traditionally referred to a means of utilizing unscheduled or unused CPU time in time partitioned systems. There have been primarily two sources of slack that were useable by fixed time windows. These sources of slack are generally described herein as "timeline slack" and "reclaimed slack." Timeline Slack generally refers to unallocated processor time. The budgets allotted to tasks are the maximal execution time reserved for every task. When adding up the total budgeted CPU time for all tasks on a timeline, the sum of budgets for the major frame is generally less than 100 percent of the total available time in the major frame. The time on the timeline that is unreserved is added together and represents the available timeline slack. Timeline slack is determinable and computed before execution at configuration time. Further, timeline slack is deterministic and unallocated CPU time can be explicitly deposited to a slack account at the beginning of each major frame, where the slack account is the sum of slack time produced by the various available sources of slack.

In contrast to timeline slack, which represents unbudgeted time, reclaimed slack represents budgeted CPU time that is unused during a task's execution. For example, as tasks execute and complete early without consuming the allotted budget for the period with respect to their worst-case budget, implicit deposits of remaining unused budgeted time are made to the slack account. Whereas timeline slack is determinable before run time, reclaimed slack is determined at run time.

In certain embodiments, to consume the slack that is deposited into the slack account by the timeline slack and the reclaimed slack, a subset of tasks are pre-configured to act as slack requesters. A slack requester is a task that is allowed to consume slack (make explicit withdrawals from the slack account). In certain implementations, all the scheduled tasks may be able to make deposits of time into the slack account, but the subset of tasks designated as slack requesters are able to withdraw time from the slack account. In at least one example, a slack requester is prevented from withdrawing slack from the slack account until the allotted budget is consumed and the task has not yet completed execution for the period. If a slack requester has consumed its allotted budget yet still has not completed execution, the slack requester task becomes eligible to be granted additional execution time from the slack account. When a slack requester task becomes eligible, the slack requester may withdraw all or a portion of the available slack time from the slack account. In at least one implementation, where there are multiple eligible slack requester tasks, the eligible slack requesting tasks are allowed to withdraw slack from the slack account based on priority. Also, when a scheduler is a rate monotonic scheduler, slack requester tasks that execute at a higher rate are given higher priority than tasks that execute at a slower rate. If the slack requester task exhausts the available slack time in the slack account and a subsequent task generates and deposits slack into the slack account, the slack requester task can be scheduled again and given access to the recently generated slack time. As a rate monotonic scheduler schedules the highest priority thread that is ready to run, slack will be consumed by the highest priority slack requester.

Figure 8:
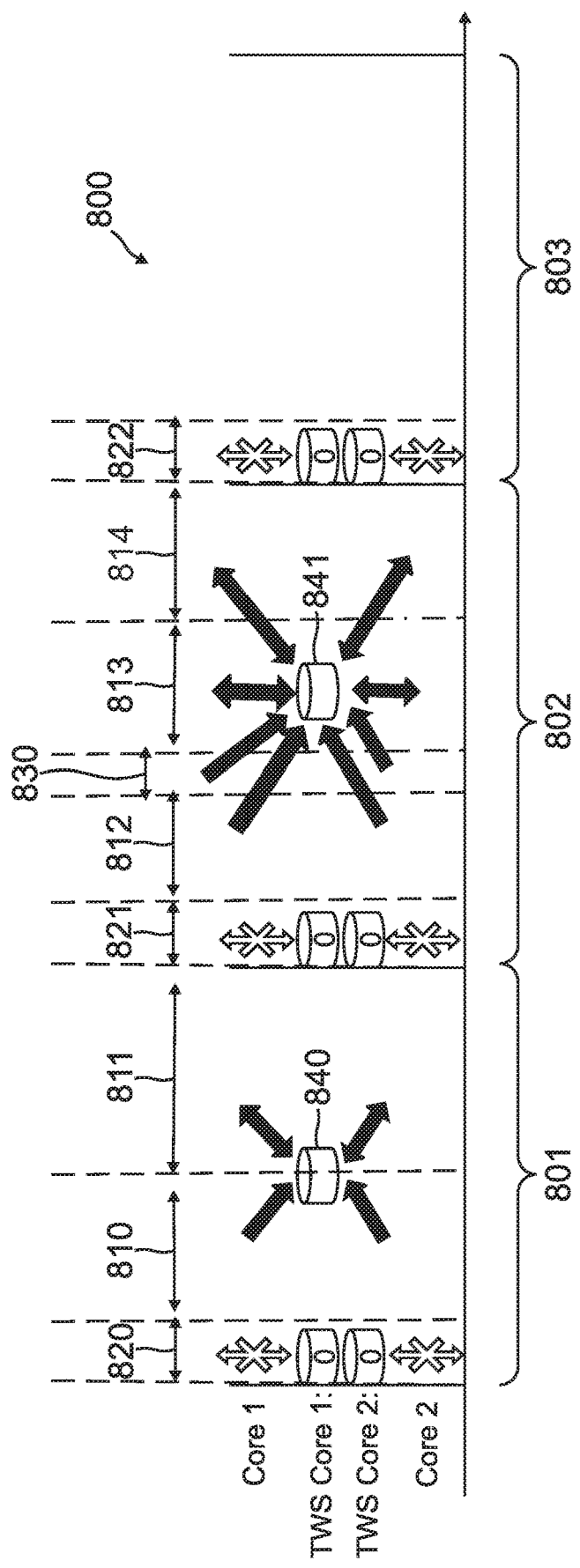
FIG. 8 is a diagram of a timeline illustrating the accumulation of time window slack in one embodiment described in the present disclosure.

In further embodiments, where a scheduler implements sliding time windows, additional sources of slack are introduced. The sliding window concept enables two new slack concepts in addition, to the traditional slack concepts. They are window timeline slack and window reclaimed slack, and are collectively referenced herein as "time window slack." Time window slack can be applied to schedulers hosting time partitioned tasks or non-time partitioned tasks. FIG. 8 is an illustration of a timeline 800 that demonstrates the depositing and withdrawing of time window slack. Time window slack includes two levels of slack. A first level of slack includes slack that spans across multiple cores and a second level of slack that corresponds to the traditional timeline slack and reclaimed slack is contributed within a scheduler instance. For clarity, these second level slack components are referenced herein as "scheduler instance timeline slack" and the "reclaimed slack" is referred herein as "scheduler instance reclaimed slack." For the first level, the time window slack is applied to all the cores. In the first level identical slack is deposited in time window slack accounts across the different cores, hence, identical slack becomes available to all of the scheduler instances running across the multiple cores. Likewise at the first level, identical slack deposits from multiple scheduler instances across the multiple cores are first level contributions. In certain implementations, the slack generated by a time window (available to windows that follow) then is the difference between the budgeted duration of the time window and the maximum CPU time used by any of the scheduler instances on the multiple cores within the time window. For the second level, scheduler instance slack is deposited within a scheduler instance for further execution of tasks associated with that scheduler instance.

In certain embodiments, the available time window slack is initialized at the completion of a window that cannot slide, and is incremented by an amount equal to the amount of time each window completes earlier than its specified duration. Slack time is usable by all tasks that have a deadline, e.g., period end time, that is later than the current time plus the accumulated slack time.

In certain implementations, the period of the slack consumer that has the fastest rate may be equal to the minor frame. When the period of the fastest rate is equal to the minor frame, the available time window slack may be initialized at the beginning of each minor frame. Hereinafter, in regards to slack, the period of the fastest rate is referred to as the minor frame. Deposits to the time window slack account and withdrawals from the time window slack account are performed through the context of sliding time windows. Time window slack accumulates within a slack account as tasks are executed within a minor frame. Accordingly, time windows earlier in a minor frame deposit slack within the slack account to be utilized by time windows scheduled for later in the minor frame. ISR time windows may deposit slack in two cases. First, when they indicate they are no longer going to service interrupts, for example, when they determine that the hardware they are servicing is defective, or some other condition is met. Secondly, ISR windows contribute to slack at the end of the last window prior to a window that can't slide early, since in this situation the ISR's budget would expire at that time. Like normal windows, ISR windows may consume slack. If an ISR is going to service interrupts, it will not deposit slack because an ISR time window may execute at any time within the minor frame as described above.

FIG. 8 illustrates the ability possessed by sliding time windows to deposit to and withdraw from time window slack accounts on a timeline 800. As shown, timeline 800 is divided into three minor frames 801, 802, and 803. Time window slack accounts 840 and 841 are shown for the first minor frame 801 and the second minor frame 802. The first minor frame 801 is associated with time window slack account 840. The second minor frame 802 is associated with time window slack account 841. Each slack account is initialized at the beginning of the associated minor frame, such that each slack account has zero slack time at the beginning of an associated minor frame.

In certain implementations, where the period for servicing ISRs is equivalent to the period for a minor frame, an ISR time window is scheduled at the beginning of each minor frame, and in this embodiment, the ISR time window will continue to service interrupts throughout the ISR time windows do not deposit or withdraw slack time from the slack accounts. As illustrated, each minor frame 801-803 has a respective ISR time window 820-822 scheduled. Each ISR time window 820-822 has crossed off double sided arrows to indicate that slack time is neither withdrawn nor deposited into a time window slack account by the ISR time windows. However, time windows other than the ISR time windows are capable of depositing slack into the slack accounts. For example, time windows 810-814 are capable of depositing slack into the slack accounts 840 and 841. Also, a gap window 830 is capable of depositing slack into the slack accounts 840 and 841. As described above, not all time windows are capable of withdrawing slack from the slack accounts 840 and 841. For example, the first time windows 810 and 812 in the minor frames 801 and 802 are unable to withdraw slack from the slack accounts 840 and 841 as illustrated by the unidirectional arrows pointing to the respective slack accounts 840 and 841. Because of the way slack is added to the slack accounts 840 and 841, there is generally no slack in the slack accounts 840 and 841 when the first time windows 810 and 812 are scheduled for execution. Also, the gap window 830 is not associated with any executable threads and thus is unable to withdraw slack from the slack accounts 840 and 841. The gap window 830 may be scheduled before a first time window, such as time windows 810 and 812. When a gap window is scheduled before a first time window in a minor frame, deposits of slack from the gap window into the slack accounts 840 and 841 may become available for withdrawal by the first time windows 810 and 812. Accordingly, slack becomes available and is deposited into the slack accounts 840 and 841 during the execution of tasks associated with the sliding time windows as tasks finish execution before the duration of an associated time window has completed.

With sliding time windows, both scheduler instance timeline slack and scheduler instance reclaimed slack can act as sources for slack. As described above, scheduler instance timeline slack is unallocated processing unit time within a scheduler instance's time windows. Scheduler instance timeline slack can be determined and computed before execution when the time windows are configured. The scheduler instance timeline slack can be added to a scheduler instance slack account either when the time windows are configured or during run time. Because scheduler instance timeline slack is deterministic, the unallocated processing unit time can be explicitly deposited to a scheduler instance slack account at the appropriate time. In at least one implementation, gaps in the timeline are similar to time windows with no associated scheduled instance and will be treated as time window slack as long as the next time window is slidable. In at least one implementation, a time window has at least one associated scheduler instance which is associated with at least one slack requester task that is able to execute if slack is available. As gaps in the timeline are not associated with executable tasks, the time allocated to the gap may be deterministically added to the slack accounts for both cores. Alternatively, the time allocated to the gap windows may also be used as time window slack that is applied to both cores at the same time.

Figure 9A:
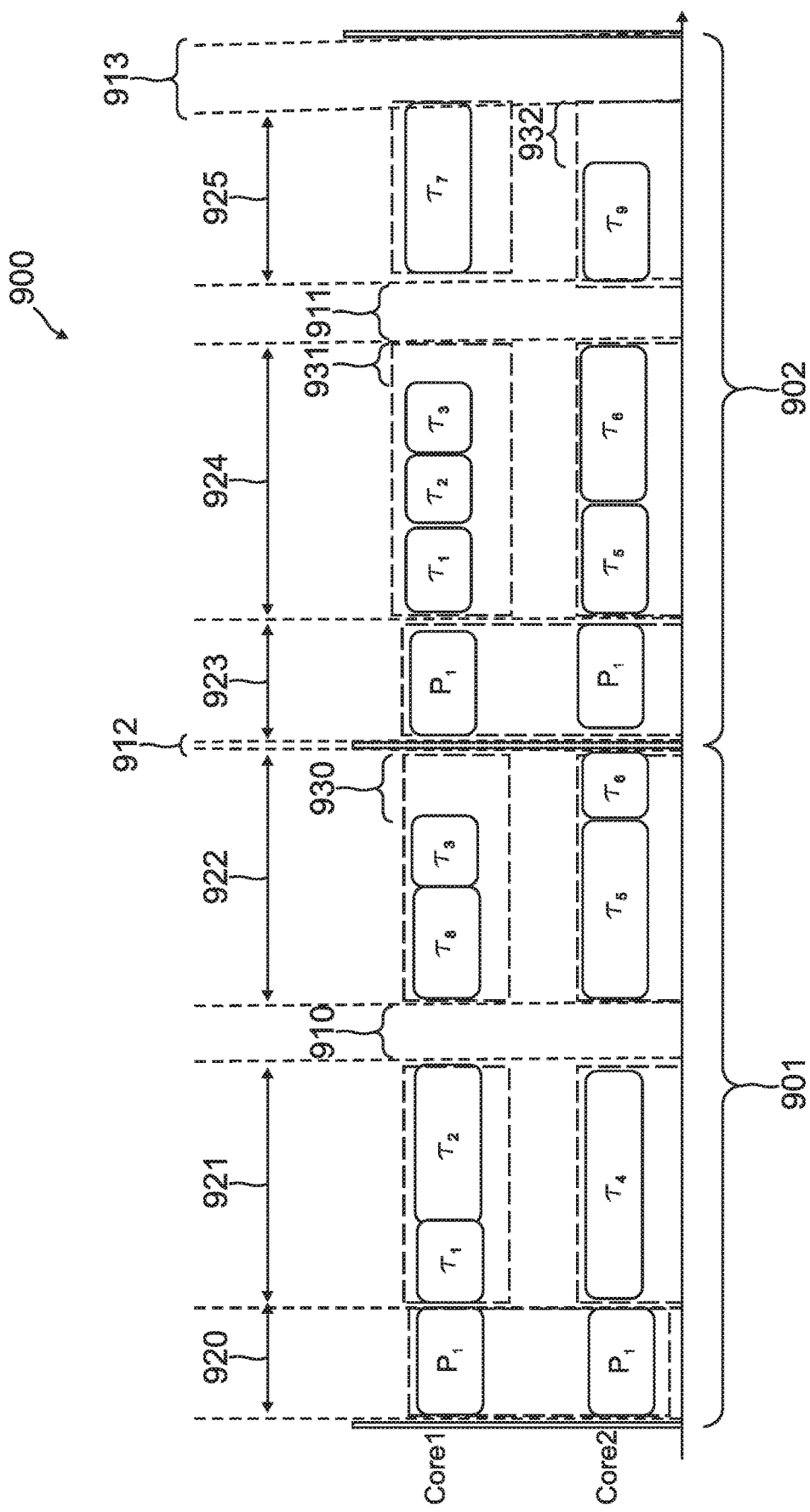
Figure 9B:
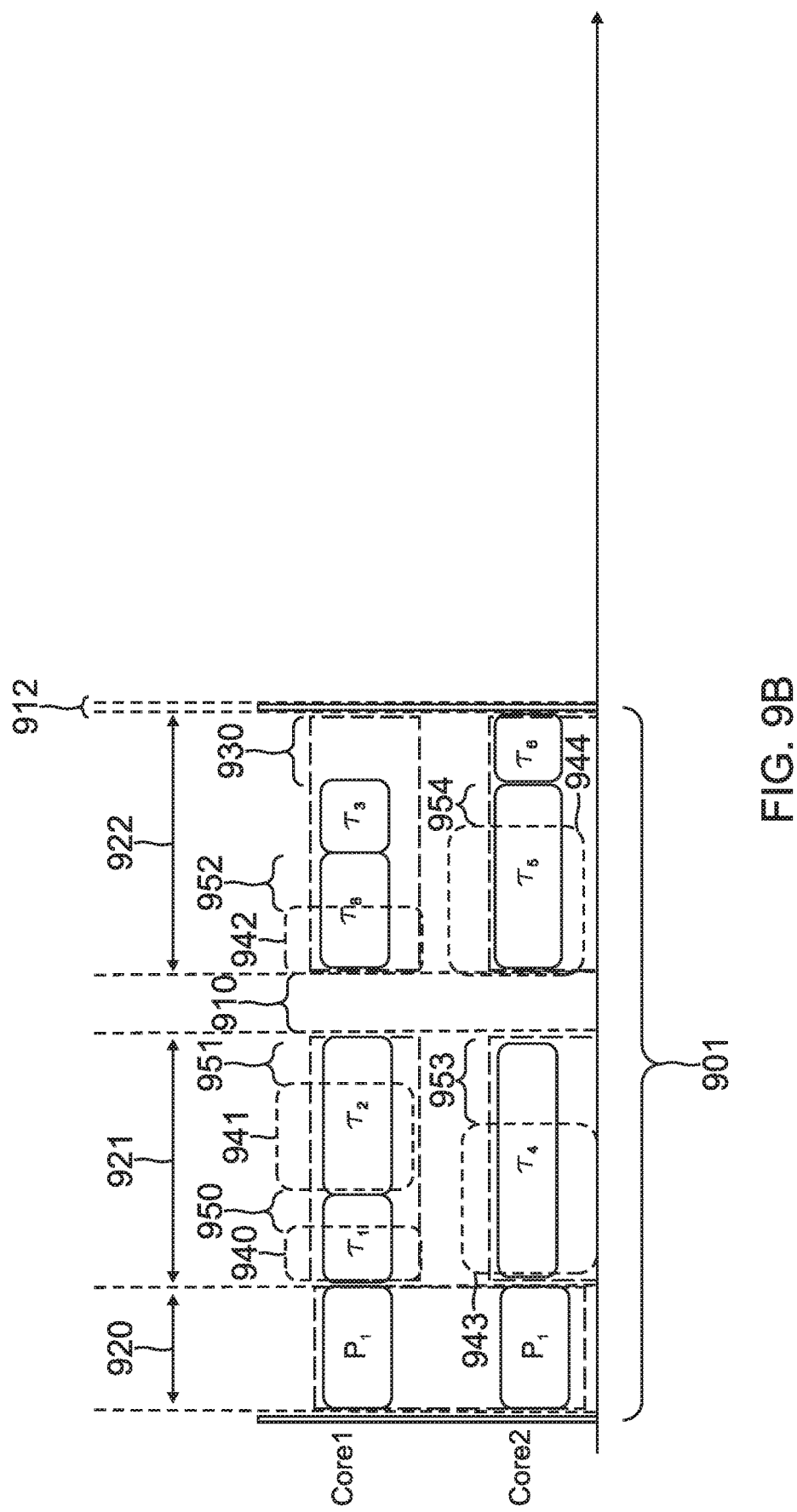
Figure 9C:
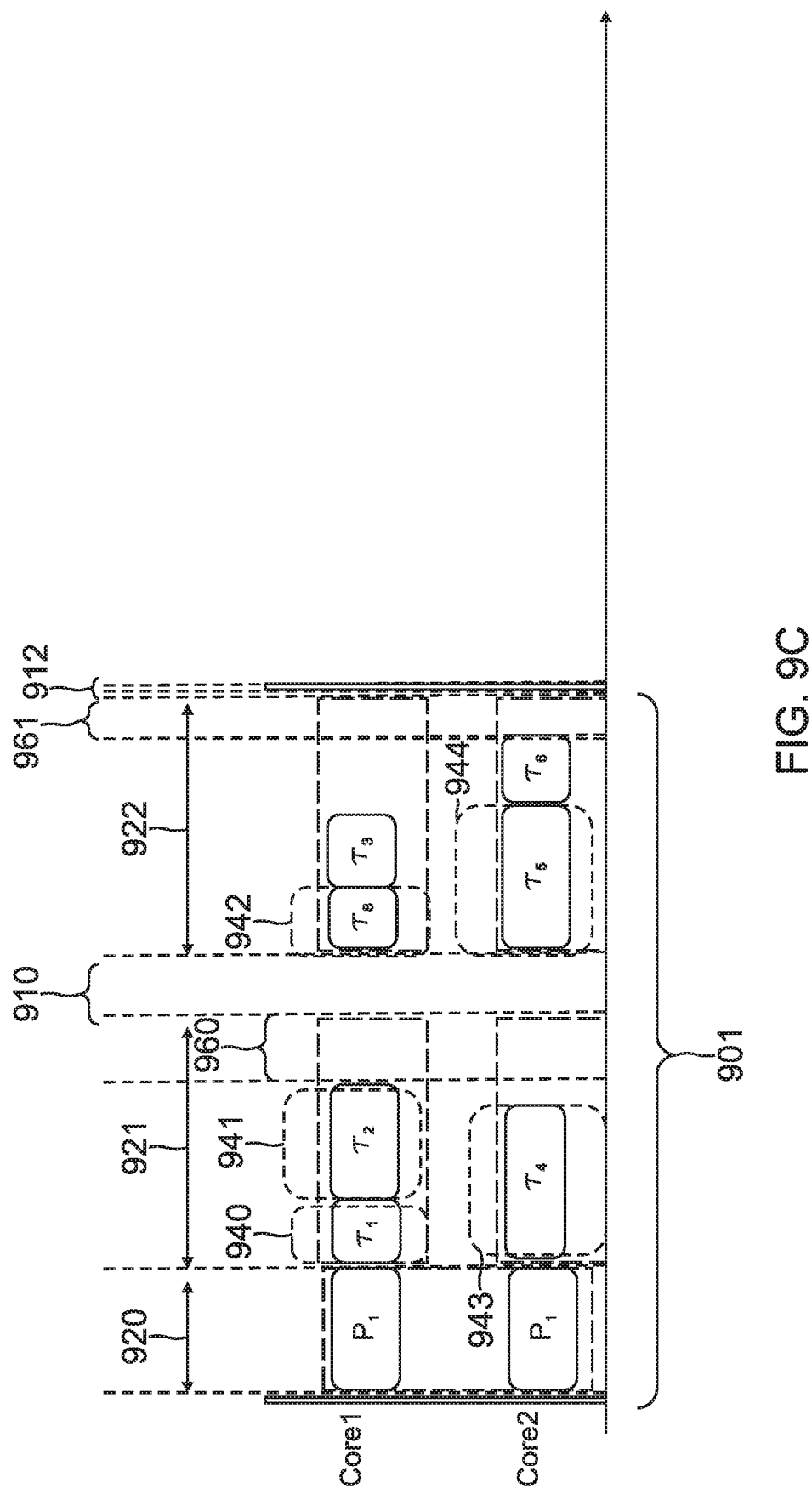

In certain embodiments as mentioned above, scheduler instance reclaimed slack may serve as another source of scheduler instance slack. As discussed above, scheduler instance reclaimed slack is budgeted processing unit execution time that goes unused when a task completes execution. For example, as a task executes and completes early with respect to a worst case budget, an implicit deposit of the remaining unused budgeted time is made to the scheduler instance slack account. In contrast to the scheduler instance timeline slack, the determination of the reclaimed slack is limited as the amount of scheduler instance reclaimed slack cannot be determined before run time. Also, scheduler instance reclaimed slack is not deterministic as slack is added when the task completes early with respect to the allotted budget. Scheduler instance reclaimed slack from an Interrupt service routine or ISR time windows may or may not be added to slack accounts as described above in conjunction with FIG. 7. As ISR windows preempt existing sliding time windows when an interrupt occurs, there is the potential that multiple occurrences of interrupt may occur anywhere in the interval between when the ISR acquired budget and the next window that is prevented from sliding and so a complete ISR budget may be used to service the multiple interrupts that may occur at any time within the interval. Accordingly, unused ISR budgets may be prevented from being used as slack as long as the interrupt needs to be serviced in the interval. FIGS. 9A-9D represent a series of diagrams of a timeline 900 illustrating the implementation of the various levels of slack in a system having sliding time windows 920-925. FIG. 9A illustrates a preconfigured timeline 900. As shown, the timeline 900 illustrates a portion of the timeline 900 encompassing a first minor frame 901 and a second minor frame 902. In subsequent FIGS. 9B-9D, only the first minor frame 901 is shown. Also, as discussed above, due to the periodicity of tasks, the time window slack re-initiates at the beginning of each of the first and second minor frames 901 and 902. As illustrated in FIG. 9, there are multiple gap windows 910 and 911. There is also a window 912. The difference between a gap window and the window 912 is that the gap window is not associated with scheduler instances while the window 912 is associated one or more scheduler instances with slack requester tasks that are able to execute when there is time window slack available. The time associated with the gap windows 910 and 911 are associated with timeline slack that is added to the time window slack accounts for both core 1 and core 2. Further, there are scheduler instance sources of timeline slack. For example, there are gaps 930 and 931 within scheduler instances where no task is executing on core 1 and tasks are executing on core 2. Likewise, on core 2, there is a scheduler instance gap 932 within a scheduler instance where no task is executing on core 2 and tasks are executing on core 1. FIGS. 9B-9D illustrate alterations in the timeline 900 that occur at runtime. The gap windows 910, 911 and 913 are sources of time window slack that can be deterministically determined before runtime. Likewise, the scheduler instance gaps 930, 931, and 932 are sources of scheduler instance timeline slack, which can also be deterministically determined before runtime.

In contrast to FIG. 9A, FIG. 9B illustrates nondeterministic sources of scheduler instance reclaimed slack that arises when tasks complete executing without exhausting all of the allotted execution time. As illustrated, the tasks that complete execution early are illustrated by the consumed times 940, 941, 942, 943, and 944. In particular, task $\tau_1$ finishes execution early, as it uses the consumed time 940. Similarly, task $\tau_2$ uses the consumed time 941, $\tau_8$ uses the consumed time 942, $\tau_4$ uses the consumed time 943, and $\tau_5$ uses the consumed time 944. As tasks $\tau_1$, $\tau_2$, $\tau_8$, $\tau_4$, and $\tau_5$ all finish executing without consuming all of the allotted budget, the unconsumed budgeted time becomes available as scheduler instance reclaimed slack 950, 951, 952, 953, and 954.

FIG. 9C illustrates the consolidation of tasks to consume the scheduler instance reclaimed slack within a scheduler instance. When tasks are consolidated within a scheduler instance, some of the scheduler instance reclaimed slack can become time window slack. For example, on core 1 in time window 921, after $\tau_1$, and $\tau_2$ execute there is still a portion of time remaining within the scheduler instance. Similarly, after $\tau_4$ executes there is also a portion of time remaining within the scheduler instance. The amount of overlapping time remaining across all cores may become run-time time window slack 960. Likewise, in time window 922, there is a portion of common non-consumed budget represented by run-time time window slack 961 that results from the scheduler instance reclaimed slack. The run-time time window slack 960 and 961 can then be added to the time window slack provided by gap window 910.

FIG. 9D illustrates adjustments made to the timeline 900 to take all available time window slack. As illustrated the time window 922 is able to slide to an earlier point in time where the time window 922 slides by an amount equal to the addition of the run-time time window slack 960 to the gap window 910. Thus, tasks associated with time window 922 are able to execute earlier and complete execution earlier, such that after the tasks associated with time window 922 completes execution, there is now slack time left in the minor frame 901 that is equal to the addition of the run-time time window slack 960 and 961 to the gap window 910. To consume the remaining slack, the time window 912 may also slide to an earlier point in time up to the end of the time window 922, where the duration of the time window 912 is changed to be equal to the available slack time at the end of the minor frame 901. Within the adjusted time window 912, associated slack requesters $\tau_3$ and $\tau_9$ are allowed to execute, consuming the remaining slack in the minor frame 901. In an alternative implementation, slack requesters in time window 922 may consume the remaining slack. Also, slack requester tasks such as $\tau_3$ may also consume slack within their respective scheduler instance for any scheduler instance slack that remains after the consolidation of the time window slack.

When using slack, a scheduler may allot budgets to appropriately sized gaps in the timeline before sliding time windows that have tasks that utilize slack in the scheduler instances. The gaps function essentially as timeline slack that is deposited into the time window slack accounts. Further, initially, at configuration, a sliding window that has a scheduler instance that utilizes slack may be created just prior to a window that may not slide, i.e., where the slack will expire. The sliding window will utilize the available time window slack that has accumulated through the execution of other scheduled time windows. By initially scheduling the sliding time window at the end of minor frames, the slack that develops may be utilized instead of lost when the non-sliding window starts.

Figure 10:
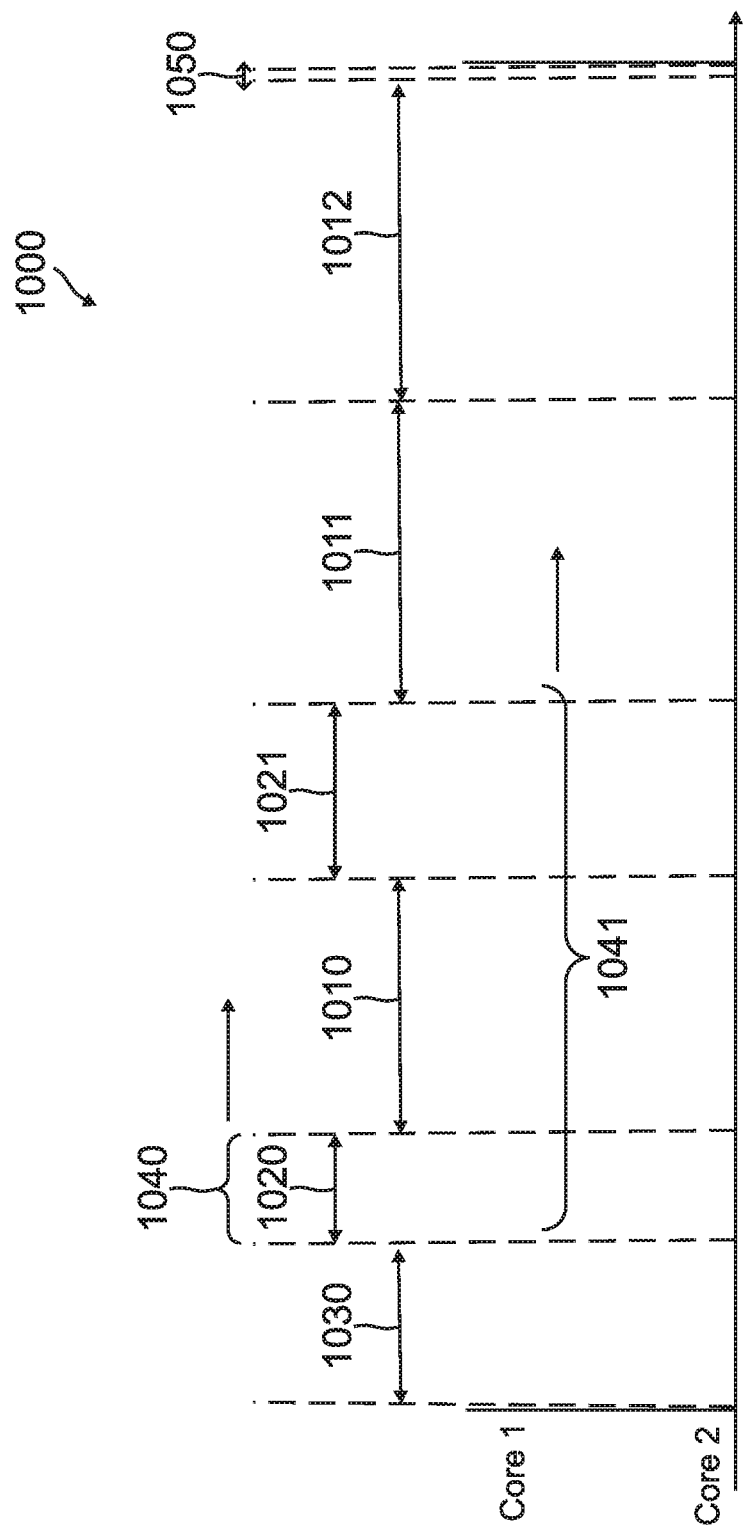
FIG. 10 is a diagram of a timeline illustrating the use of time window slack by different time windows in one embodiment described in the present disclosure.

FIG. 10 illustrates the assigning of time window durations for a single minor frame on a timeline 1000. As illustrated and described above, an initial budget of time may be allotted for the execution of interrupt service routines through the ISR time window 1030. Further, budgets are allotted for the execution of tasks for sliding time windows 1010, 1011, and 1012. Also, gap windows 1020 and 1021 along with window 1050 are scheduled on timeline 1000. As the gap windows have no associated scheduler instances, the time allotted to the gap windows is deposited into the time window slack accounts. When the time from a gap window is deposited into a time window slack account it becomes available for use by slack requesters in time windows that are after the gap window in the minor frame. For example, the time deposited into the slack account from the gap window 1020, represented as available slack 1040, is available for use by slack requesters in time windows 1010, 1011, and 1012. Additionally, the time deposited into the slack account from the gap window 1021, in conjunction with the available slack 1040 and any slack made available by the early completion of tasks associated with the time window 1010 (the sum being represented as available slack 1041), is available for use by slack requesters in time windows 1011 and 1012 and not available to time window 1010 as the gap window 1021 follows time window 1010. Further, any time left in the time window slack account after the tasks associated with time window 1012 complete execution may be used by slack requesters associated with window 1050. By using sliding time windows in conjunction with time window slack accounts, a processing entity is able to more efficiently process tasks.

Figure 11:
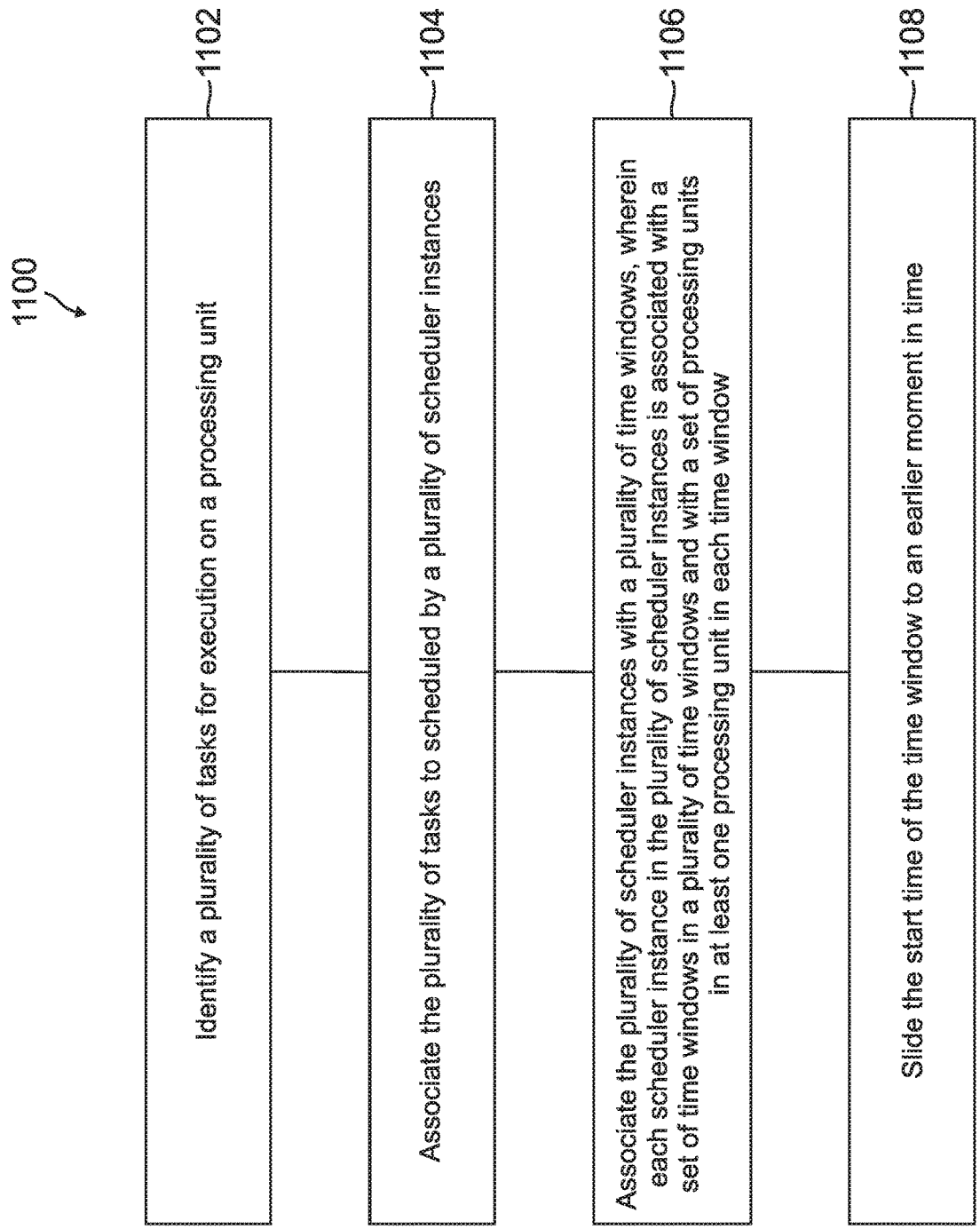
FIG. 11 is a flow diagram of a method for implementing sliding time windows in one embodiment described in the present disclosure.

FIG. 11 is a flow diagram of a method 1100 for scheduling the execution of tasks on at least one processing unit. Method 1100 proceeds at 1102 where a plurality of tasks is identified for execution on the at least one processing unit. Method 1100 then proceeds at 1104 where the plurality of tasks is associated with a plurality of scheduler instances. Method 1100 then proceeds at 1106, where the plurality of scheduler instances is associated with a plurality of time windows, wherein each scheduler instance in the plurality of scheduler instances is associated with a set of time windows in a plurality of time windows and with a set of processing units in at least one processing unit in each time window. Further, each time window in the plurality of time windows having a start time and an allotted duration and the scheduler instance associated with the time window begins executing associated tasks no earlier than the start time and executes for no longer than the allotted duration. In certain implementations, method 1100 proceeds at 1108 where the start time of the time window slides to an earlier moment in time.

Example Embodiments

Example 1 includes a system for scheduling the execution of tasks, the system comprising: at least one processing unit configured to execute a plurality of tasks, wherein each task in the plurality of tasks is scheduled to execute within a scheduler instance in a plurality of scheduler instances, each scheduler instance in the plurality of scheduler instances being associated with a set of time windows in a plurality of time windows and with a set of processing units in the at least one processing unit in each time window, one or more time windows in the plurality of time windows having a start time and an allotted duration and the scheduler instance associated with the one or more time windows begins executing associated tasks no earlier than the start time and executes for no longer than the allotted duration, and wherein the start time is slidable to earlier moments in time.

Example 2 includes the system of Example 1, wherein an executed duration for a time window in the plurality of time windows is shorter than the allotted duration when a set of tasks in the plurality of tasks associated with the scheduler instance complete execution without consuming all the time associated with the allotted duration.

Example 3 includes the system of any of Examples 1-2, wherein at least one interrupt service routine time window is scheduled, wherein the duration of the interrupt service routine time window represents available time for servicing interrupts.

Example 4 includes the system of Example 3, wherein a next time window in the plurality of time windows, scheduled immediately after the interrupt service routine time window, has a start time that slides towards the start time of the interrupt service routine time window by a time interval equal to a remaining time, wherein the remaining time represents time not used by the interrupt service routine window in the servicing of interrupt service routines.

Example 5 includes the system of Example 4, wherein the remaining time is used to service at least one interrupt that is received after the next time window begins execution, wherein a currently executing time window is preempted for the servicing of the at least one interrupt for a period of time less than or equal to the remaining time.

Example 6 includes the system of Example 5, wherein only a subset of processing units of the at least one processing unit is preempted for the servicing of the at least one interrupt.

Example 7 includes the system of any of Examples 1-6, wherein time window slack is accumulated, wherein the time window slack is used for the execution of at least one slack requester associated with at least one time window in the plurality of time windows.

Example 8 includes the system of Example 7, wherein scheduler instance timeline slack and scheduler instance reclaimed slack are monitored for the scheduler instance, wherein scheduler instance timeline slack and scheduler instance reclaimed slack that is common across the at least one processing units contribute to the time window slack.

Example 9 includes the system of Example 8, wherein the scheduler instance reclaimed slack arises when tasks associated with the scheduler instance complete execution prior to the allotted duration of the scheduler instance.

Example 10 includes the system of any of Examples 7-9, wherein the time window slack account is refreshed when a fixed time window in the plurality of time windows begins executing, wherein the fixed time window has a fixed start time that is unable to slide to an earlier moment in time.

Example 11 includes the system of any of Examples 1-10, further comprising scheduling a second time window in the plurality of time windows after the end of a first time window in the plurality of time windows, wherein the second time window is associated with at least one scheduler instance with at least one slack requester.

Example 12 includes a method for scheduling the execution of tasks by at least one processing unit, the method comprising: identifying a plurality of tasks for execution on the at least one processing unit; associating the plurality of tasks to be scheduled by a plurality of scheduler instances; associating the plurality of scheduler instances with a plurality of time windows, wherein each scheduler instance in the plurality of scheduler instances is associated with a set of time windows in the plurality of time windows and with a set of processing units in the at least one processing unit in each time window, one or more time windows in the plurality of time windows having a start time and an allotted duration and the scheduler instance associated with the one or more time windows begins executing associated tasks no earlier than the start time and executes for no longer than the allotted duration, and sliding the start time of the time window to an earlier moment in time.

Example 13 includes the method of Example 12, wherein an executed duration for a time window in the plurality of time windows is shorter than the allotted duration when a set of tasks in the plurality of tasks associated with the scheduler instance complete execution without consuming all the time associated with the allotted duration.

Example 14 includes the method of Example 13, further comprising scheduling an interrupt service routine time window, wherein the duration of the interrupt service routine time window represents available time for periodically servicing interrupts.

Example 15 includes the method of Example 14, further comprising sliding a start time of a next time window in the plurality of time windows, scheduled immediately after the interrupt service routine time window, towards the start time of the interrupt service routine time window by a time interval equal to a remaining time, wherein the remaining time represents time not used by the interrupt service routine window in the servicing of interrupt service routines, wherein the remaining time is used to service at least one interrupt that is received after the next time window begins execution, wherein a currently executing time window is preempted for the servicing of the at least one interrupt for a period of time less than or equal to the remaining time.

Example 16 includes the method of any of Examples 13-15, further comprising accumulating time window slack, wherein the time window slack is used for the execution of at least one slack requester thread in at least one time window scheduled for execution in the minor frame.

Example 17 includes the method of Example 16, further comprising initializing the time window slack account when a fixed time window in the plurality of time windows begins executing, wherein the fixed time window has a fixed start time that is unable to slide to an earlier moment in time.

Example 18 includes the system of any of Examples 16-17, wherein scheduler instance timeline slack and scheduler instance reclaimed slack are monitored for the scheduler instance, wherein scheduler instance timeline slack and scheduler instance reclaimed slack that is common across the at least one processing units contribute to the time window slack.

Example 19 includes a system for scheduling the execution of tasks, the system comprising: at least one processing unit configured to execute a plurality of tasks, wherein each task in the plurality of tasks is scheduled to execute within a scheduler instance in a plurality of scheduler instances, each scheduler instance in the plurality of scheduler instances being associated with a set of time windows in a plurality of time windows and with a set of processing units in the at least one processing unit in each time window, one or more time windows in the plurality of time windows having a start time and an allotted duration and the scheduler instance associated with the one or more time windows begins executing associated tasks no earlier than the start time and executes for no longer than the allotted duration, wherein the start time is slidable to earlier moments in time; wherein time window slack is accumulated, wherein the time window slack is used for the execution of at least one slack requester associated with at least one time window; and wherein at least one interrupt service routine time window is scheduled, wherein the interrupt service routine time window represents available time for servicing interrupts.

Example 20 includes the system of Example 19, wherein an executed duration for a time window in the plurality of time windows is shorter than the allotted duration when a set of tasks in the plurality of tasks associated with the scheduler instance complete execution without consuming all the time associated with the allotted duration.

Although specific embodiments have been illustrated and described herein, it will be appreciated by those of ordinary skill in the art that any arrangement, which is calculated to achieve the same purpose, may be substituted for the specific embodiments shown. Therefore, it is manifestly intended that this invention be limited only by the claims and the equivalents thereof.

What is claimed is:

1. A processor, comprising:
processing units configured to execute, simultaneously, respective tasks during a time window common to the processing units, having an estimated start time, and being configurable as slidable or non-slidable; and
a scheduler configured:
to determine a slack associated with a preceding time window, and
in response to the time window being configured as slidable, to advance, simultaneously in each of the processing units and by a time no greater than the slack, an actual start time of the time window relative to the estimated start time of the time window;
wherein the time window comprises at least one scheduler instance window, wherein a scheduler instance window is constrained to contain tasks of a same type, and wherein different scheduler instance windows comprise different types of tasks.

2. The processor of claim 1 wherein the preceding time window is immediately preceding the time window.

3. The processor of claim 1 wherein:
the preceding time window has an estimated end time; and
the scheduler is configured, in response to the time window being configured as slidable, to advance, simultaneously in each of the processing units and by a time no greater than the slack, an actual end time of the preceding time window relative to the estimated end time of the preceding time window.

4. The processor of claim 1 wherein the scheduler is configured:
to determine a pre-run-time-determinable slack associated with the preceding time window;
to determine an only-at-run-time-determinable slack associated with the preceding time window; and
to determine the slack in the preceding time window as being equal to a sum of the pre-run-time-determinable slack and the only-at-run-time-determinable slack.

5. The processor of claim 1 wherein the scheduler is configured to configure the time window to be slidable.

6. The processor of claim 1 wherein the scheduler is configured to configure the time window to be non-slidable.

7. The processor of claim 1 wherein the scheduler is configured to advance the actual start time of the time window to a time no sooner than an earliest start time for the time window.

8. The processor of claim 1 wherein the scheduler is further configured to schedule:
a first task for execution by one of the processing units during the time window; and
a second task for execution by another one of the processing units during the time window.

9. The processor of claim 1 wherein the scheduler is configured to schedule multiple scheduler instances within the time window.

10. The processor of claim 9 wherein the scheduler is configured to schedule:
a first task for execution by one of the processing units during one of the multiple scheduler instances; and
a second task for execution by another one of the processing units during the one of the multiple scheduler instances.

11. A method, comprising:
determining a slack associated with a preceding time window preceding a time window having an estimated start time; and
in response to the time window being configured as slidable, advancing, simultaneously across each of multiple processing units and by a time no greater than the slack, an actual start time of the time window relative to the estimated start time of the time window;
wherein the time window comprises at least one scheduler instance window, wherein a scheduler instance window is constrained to contain tasks of a same type, and wherein different scheduler instance windows comprise different types of tasks.

12. The method of claim 11 wherein determining the slack comprises:
determining a pre-run-time-determinable slack associated with the preceding time window;
determining an only-at-run-time-determinable slack in the preceding time window; and
determining the slack in the preceding time window as being equal to a sum of the pre-run-time-determinable slack and the only-at-run-time-determinable slack.

13. The method of claim 11, further comprising configuring the time window to be slidable before advancing the actual start time of the time window.

14. The method of claim 11 wherein advancing the actual start time of the time window comprises advancing the actual start time of the time window to a time no sooner than an earliest start time for the time window.

15. The method of claim 11, further comprising:
executing a first task with one of the multiple processing units during the time window; and
executing a second task with another one of the multiple processing units during the time window.

16. The method of claim 11, wherein advancing the actual start time comprises advancing, simultaneously in each of the multiple processing units and by a time no greater than the slack, an actual end time of the preceding time window relative to an estimated end time of the preceding time window.

17. The method of claim 11, further comprising scheduling multiple scheduler instances within the time window.

18. A system, comprising:
a processor, including:
processing units configured to execute, simultaneously, respective tasks during a time window common to the processing units, having an estimated start time, and being configurable as slidable or non-slidable, and
a scheduler configured:
to determine a slack associated with a preceding time window, and
in response to the time window being configured as slidable, to advance, simultaneously in each of the processing units and by a time no greater than the slack, an actual start time of the time window relative to the estimated start time of the time window;
wherein the time window comprises at least one scheduler instance window, wherein a scheduler instance window is constrained to contain tasks of a same type, and wherein different scheduler instance windows comprise different types of tasks; and
a circuit coupled to the processor.

\* \* \* \* \*